US011544608B2

(12) United States Patent
Florence et al.

(10) Patent No.: US 11,544,608 B2
(45) Date of Patent: Jan. 3, 2023

(54) SYSTEMS AND METHODS FOR PROBABILISTIC SEMANTIC SENSING IN A SENSORY NETWORK

(71) Applicant: Verizon Patent and Licensing Inc., Arlington, VA (US)

(72) Inventors: Peter Raymond Florence, Saratoga, CA (US); Christopher David Sachs, Sunnyvale, CA (US); Kent W. Ryhorchuk, Portola Valley, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 576 days.

(21) Appl. No.: 16/546,757

(22) Filed: Aug. 21, 2019

(65) Prior Publication Data

US 2019/0378030 A1 Dec. 12, 2019

Related U.S. Application Data

(63) Continuation of application No. 14/639,901, filed on Mar. 5, 2015, now Pat. No. 10,417,570.

(Continued)

(51) Int. Cl.

*G06N 7/00* (2006.01)
*H05B 47/12* (2020.01)
*H05B 47/115* (2020.01)

(52) U.S. Cl.

CPC ........... *G06N 7/005* (2013.01); *H05B 47/115* (2020.01); *H05B 47/12* (2020.01)

(58) Field of Classification Search

CPC ...... G06N 7/005; H05B 47/115; H05B 47/12; H05B 47/105; Y02B 20/40; H04L 67/12

See application file for complete search history.

(56) References Cited

U.S. PATENT DOCUMENTS 4,384,288 A 5/1983 Walton
5,161,107 A 11/1992 Mayeaux et al.

(Continued)

FOREIGN PATENT DOCUMENTS

CA 2690148 A1 12/2008
CN 102110376 B 11/2012

(Continued)

OTHER PUBLICATIONS

Crowdsourcing, citizen sensing and sensor web technologies for public and environmental health surveillance and crisis management: trends, OGC standards and application examples Boulos et al. (Year: 2011).*

(Continued)

*Primary Examiner* — Kakali Chaki
*Assistant Examiner* — Ababacar Seck

(57) ABSTRACT

Systems and methods for probabilistic semantic sensing in a sensory network are disclosed. The system receives raw sensor data from a plurality of sensors and generates semantic data including sensed events. The system correlates the semantic data based on classifiers to generate aggregations of semantic data. Further, the system analyzes the aggregations of semantic data with a probabilistic engine to produce a corresponding plurality of derived events each of which includes a derived probability. The system generates a first derived event, including a first derived probability, that is generated based on a plurality of probabilities that respectively represent a confidence of an associated semantic datum to enable at least one application to perform a service based on the plurality of derived events.

17 Claims, 20 Drawing Sheets

Related U.S. Application Data

(60) Provisional application No. 61/948,960, filed on Mar. 6, 2014.

(56) References Cited

U.S. PATENT DOCUMENTS 5,161,607 A 11/1992 Chao
5,784,023 A * 7/1998 Bluege .................. G01S 7/4815 342/104
5,793,491 A 8/1998 Wangler et al.
5,842,148 A * 11/1998 Prendergast ........ G01M 5/0016 702/34
6,118,230 A 9/2000 Fleischmann
6,364,253 B1 4/2002 Cavanagh
6,426,708 B1 7/2002 Trajkovic et al.
6,608,453 B2 8/2003 Morgan et al.
6,683,539 B2 1/2004 Trajkovic et al.
6,696,945 B1 2/2004 Venetianer et al.
6,961,313 B1 11/2005 Gaspar
6,970,083 B2 11/2005 Venetianer et al.
6,999,882 B2 2/2006 Frie et al.
7,304,727 B2 12/2007 Chien et al.
7,333,903 B2 2/2008 Walters et al.
7,583,815 B2 9/2009 Zhang et al.
7,613,324 B2 11/2009 Venetianer et al.
7,613,590 B2 11/2009 Brown
7,674,018 B2 3/2010 Holder et al.
7,817,063 B2 10/2010 Hawkins et al.
7,825,602 B2 11/2010 Hu et al.
7,827,123 B1 11/2010 Yagnik
7,868,912 B2 1/2011 Venetianer et al.
7,925,249 B2 4/2011 Funk et al.
7,925,384 B2 4/2011 Huizenga et al.
7,932,923 B2 4/2011 Lipton et al.
7,983,685 B2 7/2011 Silverstrim et al.
7,986,339 B2 7/2011 Higgins
8,027,809 B2 9/2011 Brown
8,049,592 B2 11/2011 Wang et al.
8,073,554 B2 12/2011 Vezza et al.
8,078,431 B2 12/2011 Brown
8,095,340 B2 1/2012 Brown
8,111,018 B2 2/2012 You
8,147,267 B2 4/2012 Oster
8,244,260 B2 8/2012 Silverstrim et al.
8,265,870 B1 * 9/2012 Nguyen ................... G01V 1/24 701/450
8,285,986 B2 10/2012 Shon et al.
8,306,051 B2 11/2012 Stocker et al.
8,334,901 B1 12/2012 Ganick et al.
8,334,906 B2 12/2012 Lipton et al.
8,436,542 B2 5/2013 Middleton-White et al.
8,438,175 B2 5/2013 Papke et al.
8,441,397 B2 5/2013 Binzer et al.
8,461,963 B2 6/2013 Ko et al.
8,464,182 B2 6/2013 Blumenberg et al.
8,493,209 B2 7/2013 Mohan et al.
8,510,550 B2 8/2013 Westhoff et al.
8,514,082 B2 8/2013 Cova et al.
8,522,029 B2 8/2013 Agrawal et al.
8,531,134 B2 9/2013 Chemel et al.
8,532,962 B2 9/2013 Zhang et al.
8,533,491 B2 9/2013 Klein
8,542,130 B2 9/2013 Lavoie
8,558,889 B2 10/2013 Martin et al.
8,560,357 B2 10/2013 Sickenius
8,564,661 B2 10/2013 Lipton et al.
8,575,861 B1 11/2013 Gordin et al.
8,582,816 B2 11/2013 Lee et al.
8,587,225 B2 11/2013 Ashar et al.
8,590,011 B1 11/2013 Legault
8,594,482 B2 11/2013 Fan et al.
8,607,341 B2 12/2013 Yoon et al.
8,619,079 B2 12/2013 Peterson et al.
8,619,549 B2 12/2013 Narayana et al.
8,635,049 B2 1/2014 Kauffman et al.
8,732,031 B2 5/2014 Martin et al.
8,880,199 B2 11/2014 Wei et al.
8,994,276 B2 3/2015 Recker et al.
9,374,870 B2 6/2016 Cumpston et al.
10,088,562 B2 * 10/2018 Cristache .............. G01S 5/0289
2002/0195975 A1 12/2002 Schanberger et al.
2003/0102979 A1 6/2003 Jednacz et al.
2003/0222587 A1 12/2003 Dowling, Jr. et al.
2004/0124338 A1 7/2004 Cloutier et al.
2005/0285547 A1 12/2005 Piepgras et al.
2007/0050240 A1 * 3/2007 Belani ...................... G08G 1/14 705/13
2007/0198222 A1 * 8/2007 Schuster .................. G01D 1/00 702/187
2007/0234036 A1 10/2007 Tat Kin et al.
2007/0294393 A1 12/2007 Smith et al.
2008/0215391 A1 9/2008 Dowling et al.
2009/0026966 A1 1/2009 Budde et al.
2009/0066540 A1 3/2009 Marinakis et al.
2009/0218951 A1 9/2009 Weaver
2009/0262189 A1 10/2009 Marman
2009/0278479 A1 11/2009 Platner et al.
2009/0299527 A1 12/2009 Huizenga et al.
2009/0307255 A1 12/2009 Park
2010/0001652 A1 1/2010 Damsleth
2010/0204847 A1 8/2010 Leete, III et al.
2010/0228601 A1 9/2010 Vaswani et al.
2010/0265100 A1 10/2010 Jalbout et al.
2011/0002324 A1 1/2011 Falck et al.
2011/0066297 A1 3/2011 Saberi et al.
2011/0133655 A1 6/2011 Recker et al.
2011/0158410 A1 6/2011 Falk et al.
2011/0199004 A1 8/2011 Henig et al.
2011/0309756 A1 12/2011 Chao
2012/0002406 A1 1/2012 Leadford et al.
2012/0038281 A1 2/2012 Verfuerth
2012/0040606 A1 2/2012 Verfuerth
2012/0043889 A1 2/2012 Recker et al.
2012/0062123 A1 3/2012 Jarrell et al.
2012/0068608 A1 3/2012 Covaro et al.
2012/0086561 A1 4/2012 Ilyes et al.
2012/0130544 A1 5/2012 Mohan et al.
2012/0130774 A1 5/2012 Ziv et al.
2012/0143357 A1 * 6/2012 Chemel .................. G05B 15/02 700/90
2012/0146518 A1 6/2012 Keating et al.
2012/0191770 A1 7/2012 Perlmutter et al.
2012/0262093 A1 10/2012 Recker et al.
2012/0310984 A1 12/2012 Branson et al.
2013/0010251 A1 1/2013 Croft et al.
2013/0013091 A1 1/2013 Cavalcanti et al.
2013/0073192 A1 3/2013 Hota et al.
2013/0088168 A1 4/2013 Mohan et al.
2013/0107041 A1 5/2013 Norem et al.
2013/0134886 A1 5/2013 Golding et al.
2013/0144564 A1 * 6/2013 DeVaul .................. G01R 29/00 702/196
2013/0144814 A1 * 6/2013 Klinger .................. G06N 7/005 706/12
2013/0158952 A1 6/2013 Liebel et al.
2013/0159454 A1 6/2013 Hunter et al.
2013/0211613 A1 8/2013 Praske et al.
2013/0221203 A1 8/2013 Barrilleaux
2013/0227569 A1 8/2013 Kohli et al.
2013/0229804 A1 9/2013 Holder et al.
2013/0258107 A1 10/2013 Delibaltov et al.
2013/0262483 A1 * 10/2013 Blom .................. G06F 16/9535 707/E17.058
2013/0265563 A1 10/2013 Vogt et al.
2013/0285855 A1 * 10/2013 Dupray ................. G01S 5/0278 342/451
2013/0297212 A1 11/2013 Ramer et al.
2013/0342355 A1 12/2013 Lund et al.
2013/0346229 A1 * 12/2013 Martin ...................... G06F 8/61 705/26.3
2014/0028199 A1 1/2014 Chemel
2014/0084795 A1 * 3/2014 Cumpston ............. H05B 45/10 315/149

(56) References Cited

U.S. PATENT DOCUMENTS

| | | | | |
|---|---|---|---|---|
| 2014/0297227 | A1* | 10/2014 | Barnard | H05B 47/115 702/189 |
| 2014/0350964 | A1* | 11/2014 | Rhodes | G16H 40/20 705/3 |
| 2015/0161439 | A1 | 6/2015 | Krumm | |
| 2017/0344832 | A1* | 11/2017 | Leung | G06K 9/00342 |

FOREIGN PATENT DOCUMENTS

| | | | |
|---|---|---|---|
| CN | 102867386 | A | 1/2013 |
| CN | 20293979 | U | 5/2013 |
| CN | 202939797 | | 5/2013 |
| CN | 103687200 | A | 3/2014 |
| EP | 1658579 | A1 | 5/2006 |
| EP | 2273427 | | 1/2011 |
| EP | 2581888 | A1 | 4/2013 |
| EP | 2660625 | A1 | 11/2013 |
| EP | 2709428 | A2 | 3/2014 |
| JP | 2007504551 | | 3/2007 |
| JP | 2007310741 | | 11/2007 |
| JP | 2014064274 | A | 4/2014 |
| KR | 1020070044243 | A | 4/2007 |
| KR | 100760535 | B1 | 9/2007 |
| KR | 100784836 | B1 | 12/2007 |
| KR | 20100136186 | A | 12/2010 |
| KR | 20110017037 | A | 2/2011 |
| KR | 20110055807 | A | 5/2011 |
| KR | 20150089983 | A | 8/2015 |
| WO | WO-2003055734 | A1 | 7/2003 |
| WO | WO-2008008505 | A2 | 1/2008 |
| WO | WO-2008085815 | A1 | 7/2008 |
| WO | WO-2009076182 | A1 | 6/2009 |
| WO | WO-2011041903 | A1 | 4/2011 |
| WO | WO-2011053969 | A2 | 5/2011 |
| WO | WO-2011055261 | A1 | 5/2011 |
| WO | WO-2011121470 | A1 | 10/2011 |
| WO | WO-2011132013 | A1 | 10/2011 |
| WO | WO-2012042432 | A1 | 4/2012 |
| WO | WO-2012092150 | A2 | 7/2012 |
| WO | WO-2012140152 | A1 | 10/2012 |
| WO | WO-2013131189 | A1 | 9/2013 |
| WO | WO-2013165777 | A1 | 11/2013 |
| WO | WO-2015134879 | A1 | 9/2015 |

OTHER PUBLICATIONS

Probabilistic Sensor Deployment in Wireless Sensor Network: A New Approach Rahman et al. (Year: 2007).*

A survey of Wireless Sensor Network technologies: research trends and middleware's role Eiko Yoneki, Jean Bacon (Year: 2005).*

A semantic solution for data integration in mixed sensor networks Ibrahim et al. (Year: 2005).*

Sensor Fusion-Based Vacant Parking Slot Detection and Tracking Suhr et al. (Year: 2014).*

A dynamic and context-aware semantic mediation service for discovering and fusion of heterogeneous sensor data Bakillah et al. (Year: 2013).*

"European Application Serial No. 13184124.9, Extended European Search Report dated Jun. 5, 2015", 9 pgs.

"European Application Serial No. 13184124.9, Response filed Jan. 8, 2016 to Extended European Search Report dated Jun. 5, 2015", 22 pgs.

"International Application Serial No. PCT/US2014/031723, International Search Report dated Jul. 7, 2014", 3 pgs.

"International Application Serial No. PCT/US2015/019195, International Search Report dated Jun. 16, 2015", 3 pgs.

"International Application Serial No. PCT/US2015/019195, Written Opinion dated Jun. 16, 2015", 8 pgs.

"International Application Serial No. PCT/US2015/019296, International Search Report dated Jun. 1, 2015", 3 pgs.

"International Application Serial No. PCT/US2015/019296, Written Opinion dated Jun. 1, 2015", 8 pgs.

"Korean Application Serial No. 2013-0109844, Response filed Oct. 14, 2014 to Office Action dated Jul. 24, 2014", W/ English Claims.

"Korean Application Serial No. 2013109844, Office Action dated Feb. 26, 2015", W/ English Translation, 6 pgs.

"Korean Application Serial No. 2013109844, Response filed Mar. 30, 2015 to Office Action dated Feb. 26, 2015", W/ English Claims, 20 pgs.

U.S. Appl. No. 14/024,561, Non Final Office Action dated Jul. 22, 2015, 12 pgs.

U.S. Appl. No. 14/024,561, Notice of Allowance dated Feb. 19, 2016, 5 pgs.

U.S. Appl. No. 14/024,561, Notice of Allowance dated Nov. 25, 2015, 5 pgs.

U.S. Appl. No. 14/024,561, Response filed Oct. 21, 2015 to Non Final Office Action dated Jul. 22, 2015, 13 pgs.

U.S. Appl. No. 14/224,300, Non Final Office Action dated Jul. 8, 2014, 24 pgs.

International Application Serial No. PCT/US2013/037968, International Search Report dated Jul. 2, 2013, 2 pgs.

International Application Serial No. PCT/US2013/045407, International Search Report dated Sep. 23, 2013, 8 pgs.

International Application Serial No. PCT/US2015/019195, International Preliminary Reporton Patentability filed Sep. 6, 2016, 9 pgs.

Korean Application Serial No. 10-2013-0109844, Office Action dated Jul. 24, 2014.

Korean Application Serial No. 2013-109844, Final Rejection After Reexamination dated Apr. 14, 2015, WI English Translation, 6 pgs.

Loia, et al., "Swarm-based approach to evaluate fuzzy classification of semantic sensor data", Pervasive Computing and Communications Workshops {Percom Workshops), 2012 IEEE International Conference on, IEEE, Mar. 19, 2012, pp. 308-313, XP032179975, DOI: 10.1109/PERCOMW.2012.6197501.

Moodley, et al., "A Semantic Infrastructure for Knowledge Driven Sensor Web", Oct. 23, 2011 {Oct. 23, 2011), KP055404987, Retrieved from the Internet: URL:http://ceur-ws.orgNol-839/moodley.pdf [retrieved on Sep. 8, 2017].

Munoz, D, et al., "Position Location Techniques and Applications", Academic Press, (2009).

Theodoridis, et al., "Developing an IoT Smart City framework", IISA 2013, IEEE, Jul. 10, 2013 {Jul. 10, 2013), pages framework, 1-6, XP032498128, DOI: 10.1109/IISA.2013.6623710.

Xu, J, et al., "Distance Measurement Model Based on RSSI in WSN", Wireless Sensor Network, (2010), 606-611.

Akyildiz, et al., "On Exploiting Spatial and Temporal Correlation in Wireless Sensor Networks", Broadband & Wireless Networking Laboratory School of Electrical & Computer Engineering Georgia Institute of Technology, Atlanta, GA 30332, 10 pages, 2004.

* cited by examiner

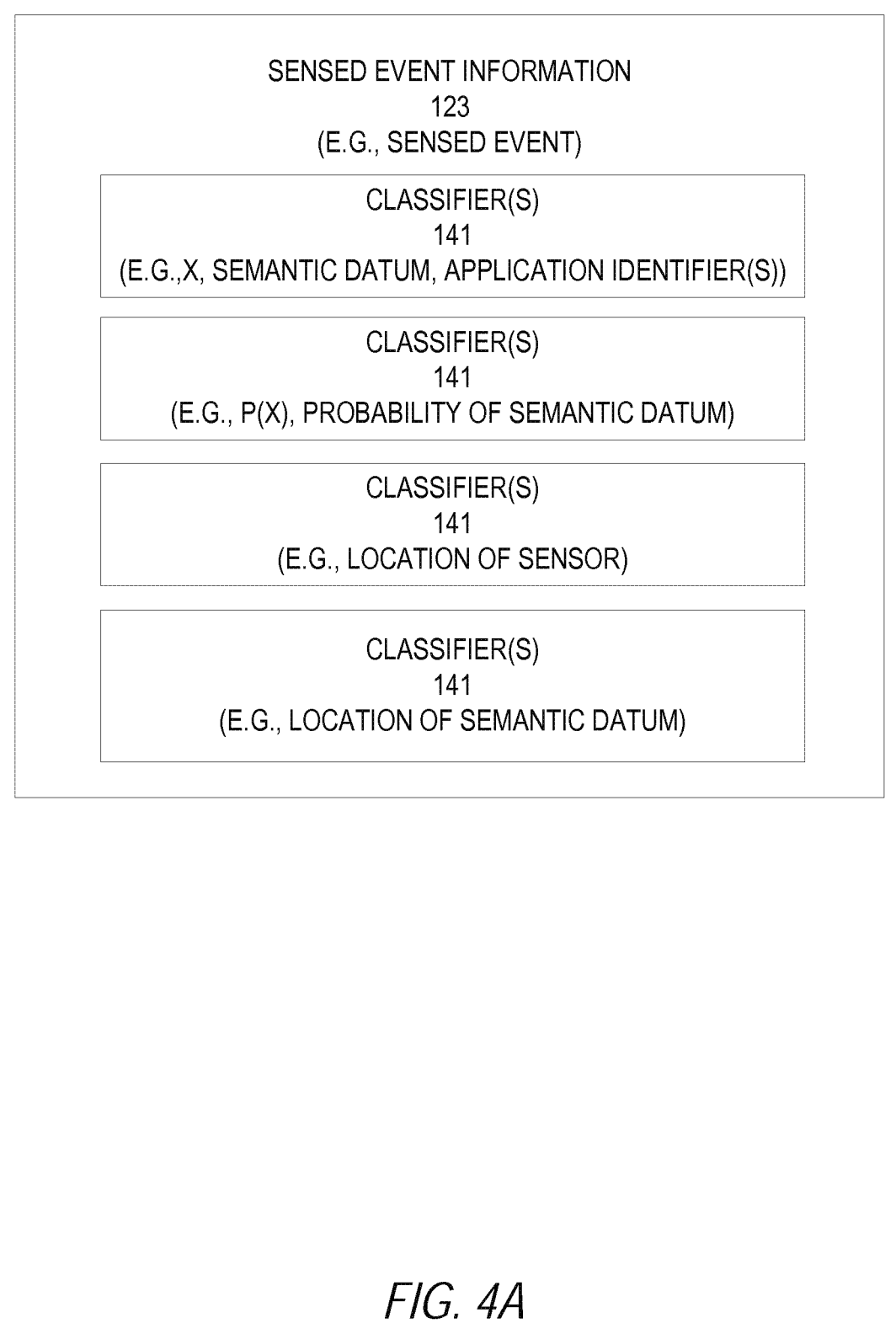

SENSED EVENT INFORMATION
123
(E.G., SENSED EVENT)

CLASSIFIER(S)
141
(E.G.,X, SEMANTIC DATUM, APPLICATION IDENTIFIER(S))

CLASSIFIER(S)
141
(E.G., P(X), PROBABILITY OF SEMANTIC DATUM)

CLASSIFIER(S)
141
(E.G., LOCATION OF SENSOR)

CLASSIFIER(S)
141
(E.G., LOCATION OF SEMANTIC DATUM)

FIG. 4A

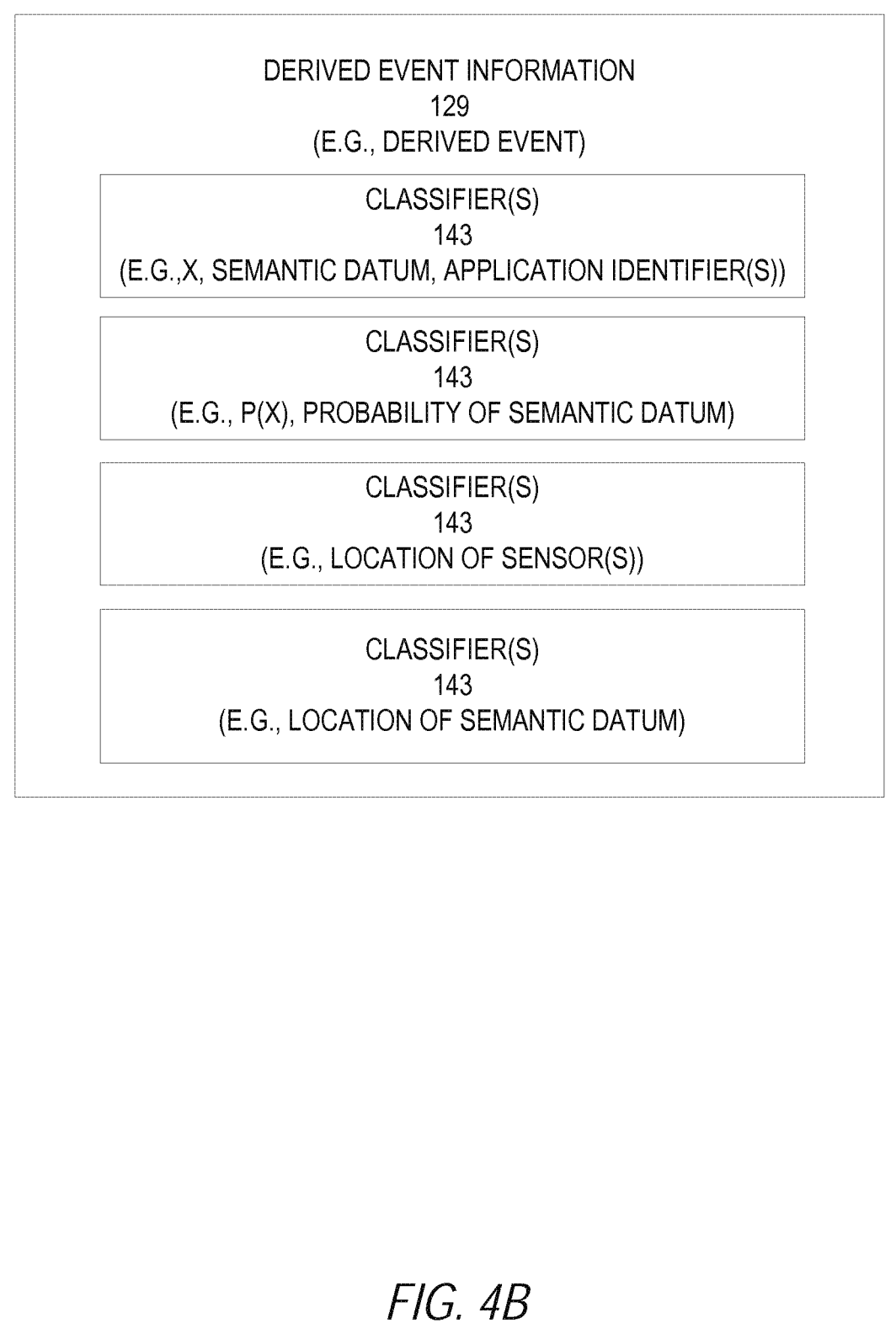

DERIVED EVENT INFORMATION
129
(E.G., DERIVED EVENT)

CLASSIFIER(S)
143
(E.G.,X, SEMANTIC DATUM, APPLICATION IDENTIFIER(S))

CLASSIFIER(S)
143
(E.G., P(X), PROBABILITY OF SEMANTIC DATUM)

CLASSIFIER(S)
143
(E.G., LOCATION OF SENSOR(S))

CLASSIFIER(S)
143
(E.G., LOCATION OF SEMANTIC DATUM)

*FIG. 4B*

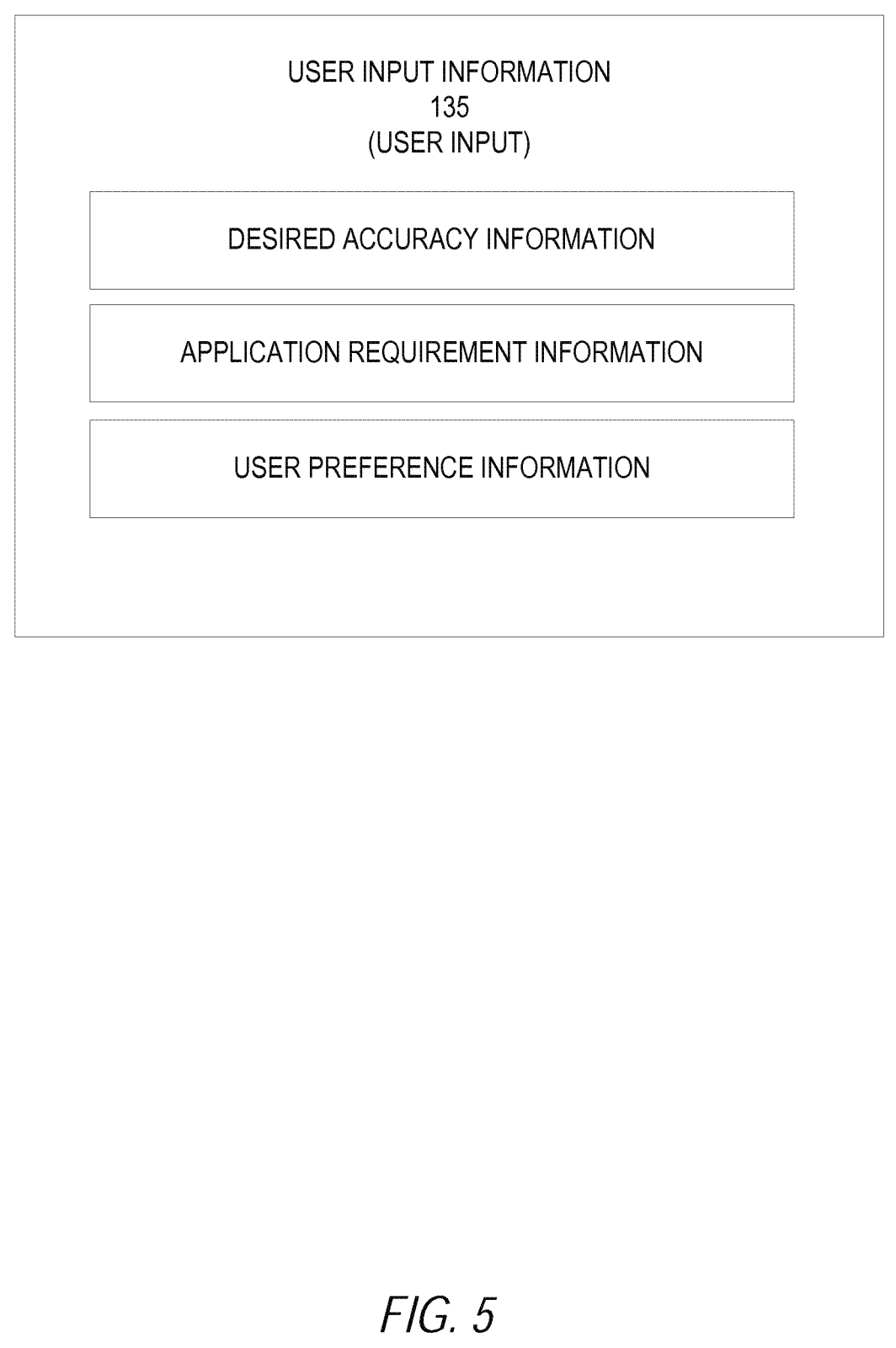

USER INPUT INFORMATION
135
(USER INPUT)

DESIRED ACCURACY INFORMATION

APPLICATION REQUIREMENT INFORMATION

USER PREFERENCE INFORMATION

FIG. 5

SYSTEMS AND METHODS FOR PROBABILISTIC SEMANTIC SENSING IN A SENSORY NETWORK

RELATED APPLICATIONS

This application is a continuation application of U.S. patent application Ser. No. 14/639,901, entitled "Systems and Methods for Probabilistic Semantic Sensing in a Sensory Network," filed Mar. 5, 2015, which claims the benefit of U.S. Provisional Application No. 61/948,960, entitled "Probabilistic Semantic Sensing for Light Sensory Networks," filed Mar. 6, 2014, both of which are incorporated by reference in their entireties. This application is related to U.S. Non-Provisional Patent Application No. 14/024,561, entitled "Networked Lighting Infrastructure for Sensing Applications," filed Sep. 11, 2013 and U.S. Provisional Application No. 61/699,968, of the same name, filed Sep. 12, 2012.

TECHNICAL FIELD

This disclosure relates to the technical field of data communications. More particularly, systems and methods for probabilistic semantic sensing in a sensory network.

BACKGROUND

Sensory networks include multiple sensors that may be used to sense and identify objects. The objects that are being sensed may include people, vehicles, or other entities. An entity may be stationary or in motion. Sometimes a sensor may not be positioned to fully sense the entire entity. Other times an obstruction may impair the sensing of the entity. In both instances, real world impairments may lead to unreliable results.

BRIEF DESCRIPTION OF THE DRAWINGS

FIG. 4A is a block diagram illustrating sensed event information, according to an embodiment;

FIG. 4B is a block diagram illustrating derived event information, according to an embodiment;

FIG. 5 is a block diagram illustrating user input information, according to an embodiment;

Figure 1:
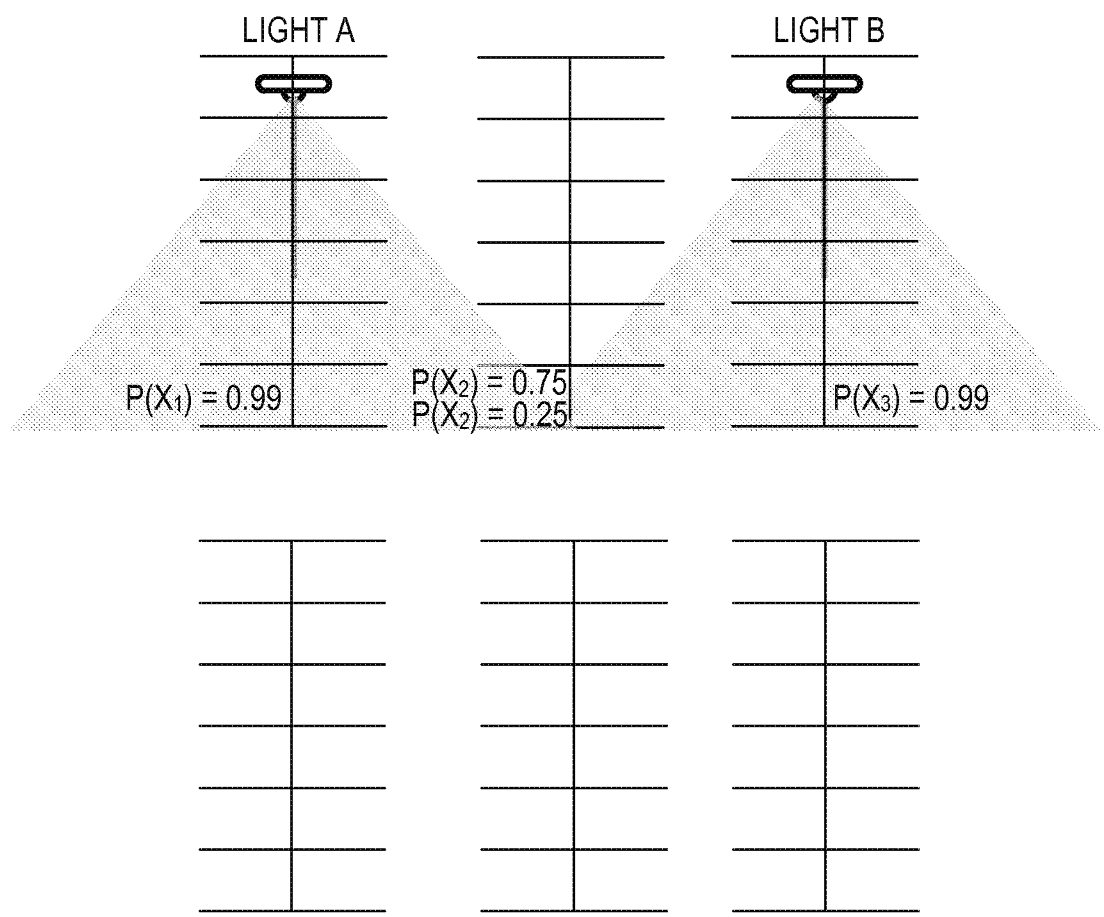
FIG. 1 illustrates a system, according to an embodiment, for probabilistic semantic sensing in a sensory network.

In the following description, for purposes of explanation, numerous specific details are set forth in order to provide a thorough understanding of some example embodiments. It will be evident, however, to one of ordinary skill in the art, that embodiments of the present disclosure may be practiced without these specific details.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The present disclosure is directed to probabilistic semantic sensing in a sensory network. It addresses the problems of accurately sensing observable phenomena in the presence of real world obstructions or impairments. It addresses the problem by parallel sensing the same underlying physical phenomena and generating a single probability in association with a meaning or semantic for the physical phenomena. Specifically, it addresses the problem by parallel sensing the same underlying physical phenomena to generate semantic data in the form of sensed events each including a semantic datum (e.g., parking spot is empty) that describe the physical phenomena, associates each semantic datum with a probability that quantifies the reliability of the semantic datum, correlates the sensed events based on classifiers to produce a logical aggregation of semantic data (e.g., same parking spot), analyzes the aggregation of semantic data with a probabilistic engine to produce a single derived event for the multiple sensed events where the single derived event includes a single derived probability and enables one or more applications that use the derived event. One having ordinary skill in the art will recognize that, while the present disclosure is discussed primarily in the context of a light sensory network, it is directed to sensory networks that are capable of sensing all types of physical phenomena (e.g., visual, audible, tactile, etc.).

The advent of the light sensory network, or a lighting infrastructure with embedded capabilities for application platforms, sensing, networking, and processing has created the opportunity to distribute sensors and enable sensing-based applications at significant scales and spatial densities. The success of the applications enabled by light sensory networks, however, may be limited by the reliability of sensor data that may, in part, be restricted due to the locations of sensor deployment or the interference caused by real-world obstructions (foliage, cars, people, other objects, etc.). Additionally, for any given sensor, various portions of the data produced may be more or less reliable—for example, a video sensor may be more reliable at detecting the occupancy state of a car spot right in front of the sensor than it is at a location farther away, due to the limited resolution. Additionally, the infeasibility of communicating the entirety of data collected at each node in a light sensory network strongly suggests that conclusions regarding data be made at intermediate steps before the data or data outputs are combined. In other words, not all raw data may be accessible in the same location. To the extent that multiple sensors may produce relevant data for a certain computation related to an application of a light sensory network, or to the extent that external data inputs may affect such a computations, it is optimal to create a system in which these multiple sources of data may be optimally combined to produce maximally useful computational results and thus maximally successful applications.

The present disclosure describes the creation of probabilistic systems and methods that optimize the usefulness of conclusions based on data with limited reliability from a light sensory network. The systems and methods described include the association of each semantic datum with an associated probability representing the certainty or confidence of that datum, and using the parameters of semantic data to correlate different semantic data and derive events with derived probabilities using a probabilistic engine. The enhanced reliability is described in the context of lighting management and monitoring, parking management, surveillance, traffic monitoring, retail monitoring, business intelligence monitoring, asset monitoring, and environmental monitoring.

One system for implementing methods described may include a light sensory network (LSN). The LSN may include an integrated application platform, sensor, and network capabilities, as described below. The LSN relevant to this disclosure may be architected in such a way that some processing of raw sensor data occurs locally on each node within the network. The output of this processing may be semantic data, or in other words, metadata or derived data that represents key features detected during processing. The purpose of producing the semantic data is to reduce the scale of data to then be passed along for further analysis. A LSN relevant to this disclosure may also be architected in such a way that the semantic data is communicated beyond the node of origin so that the semantic data is aggregated and correlated with other semantic data. The network connectivity of a LSN may employ a variety of topologies, but the present disclosure is agnostic to the specific topology (hub-and-spoke, ad-hoc, etc.) as long as an aggregation point within the network occurs where multiple sources of semantic data are combined.

FIG. 1 illustrates a system 101, according to an embodiment, for probabilistic semantic sensing in a sensory network. The system 101 may include sensory network including a "LIGHT A" that is positioned on the left and a "LIGHT B" that is positioned on the right. "LIGHT A" and "LIGHT B" may each include a sensing node that communicate with each other and other sensing nodes (not shown) as part of a sensory network. Each of the sensory nodes contains one or more sensors that sense raw sensor data for different parts of parking lot and, more specifically, for an occupancy state of parking spots in the parking lot. For example, "LIGHT A" is illustrated as receiving raw sensor data for part of a parking lot and generating semantic data including a semantic datum for parking spot $X_1$ and a semantic datum for parking spot $X_2$. Further for example, "LIGHT B" is illustrated as receiving raw sensor data for a different part of the parking lot and generating semantic data including a semantic datum for parking spot $X_2$ and a semantic datum for parking lot $X_3$. More specifically, "LIGHT A" captures a semantic datum in the form of an occupancy state of "empty" for parking spot $X_1$ with a probability of 99% (e.g., $P(X_1)=0.99$) that the "empty" status is accurate and an occupancy state of "empty" for parking spot $X_2$ with a probability of 75% (e.g., $P(X_2)=0.75$) that the "empty" status is accurate. The lower probability for the parking spot $X_2$ may be due to a limited visibility of the parking spot $X_2$ as sensed by "LIGHT A" (e.g., fewer pixels). Further, "LIGHT B" captures a semantic datum in the form of an occupancy state of "empty" for parking spot $X_2$ with a probability of 25% and a semantic datum of an occupancy state of "empty" for parking spot $X_3$ with a probability of 99% where the lower percentage for parking spot $X_2$ is again due to limited visibility. That is, FIG. 1 illustrates semantic data including probabilities that vary depending on location.

Figure 2:
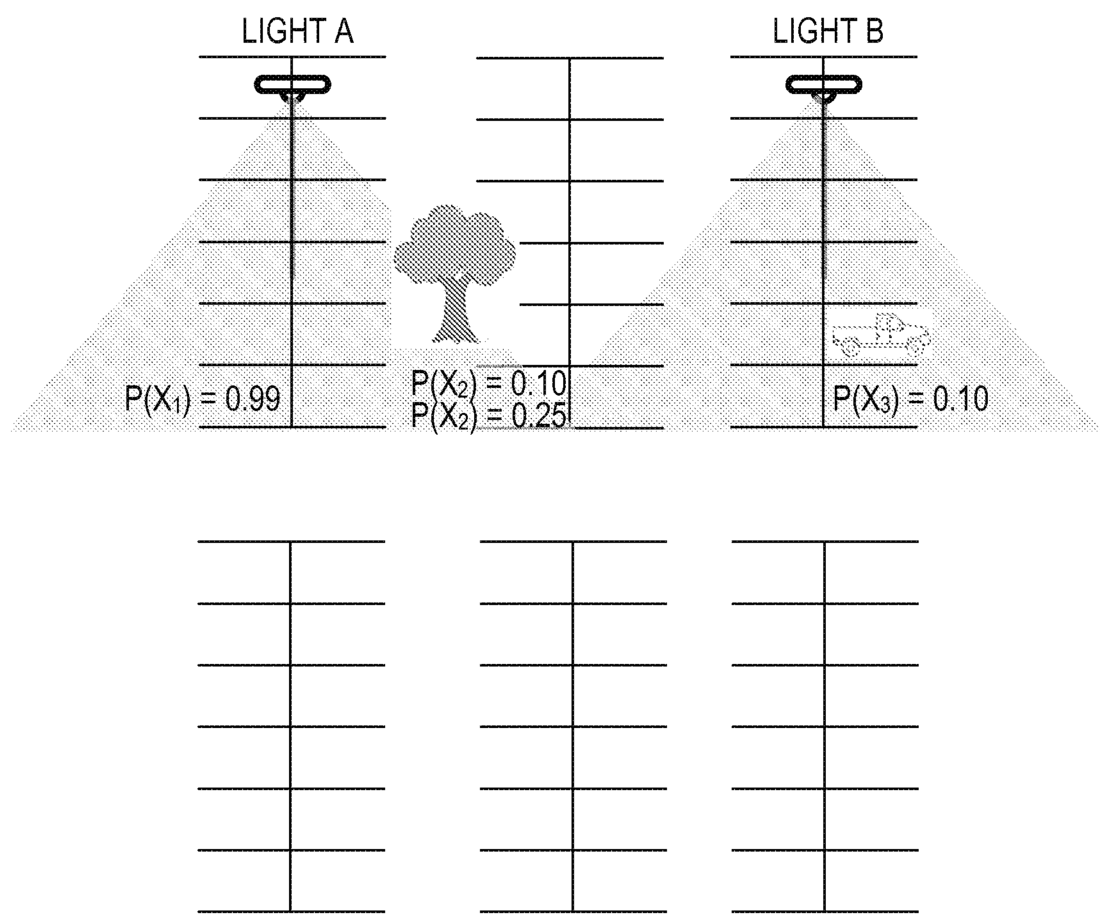
FIG. 2 further illustrates a system, according to an embodiment, for probabilistic semantic sensing in a sensory network.

FIG. 2 illustrates a system 103, according to an embodiment, for probabilistic semantic sensing in sensory networks. The system 103 operates in a similar manner as system 101. The system 103 is illustrated to show how real-world obstructions (e.g., trees, other vehicles, etc.) limit the probability of the semantic data. Specifically, "LIGHT A" is illustrated as capturing a semantic datum indicating parking spot $X_2$ as empty with a probability of 10% and "LIGHT B" as capturing a semantic datum indicating parking spot $X_3$ as empty with a probability of 10%. The reduced confidence for parking spot $X_2$ is due to a tree which obstructs the sensors at "LIGHT A" from fully sensing the parking spot $X_2$ and the reduced confidence for parking spot $X_3$ is due to a truck which obstructs the sensors at "LIGHT B" from fully sensing the parking spot $X_3$. That is, FIG. 2 illustrates semantic data including probabilities that vary depending on obstructions.

Regarding the process of determining semantic data from raw sensor data, the present disclosure does not claim any specifics of such a process other than the sole exceptions of (i) associating each semantic datum with the probability of that semantic datum, (ii) associating each semantic datum with the spatial and temporal coordinates of the location of the sensor, and (iii) associating each semantic datum with the spatial and temporal coordinates of the event detected remotely from the sensor.

The types of raw sensor data that may be analyzed in order to produce semantic data include, but are not limited to, environmental sensor data, gases data, accelerometer data, particulate data, power data, RF signals, ambient light data, motion detection data, still images, video data, audio data, etc. According to some embodiments, a variety of sensor nodes in a LSN may employ processing of raw sensor data to produce probabilistic semantic data. The probabilistic semantic data may represent events including the detection of people, vehicles, or other objects via computer vision (video analytics) processing or other analysis of large datasets that occur locally on a node in the network.

Figure 3:
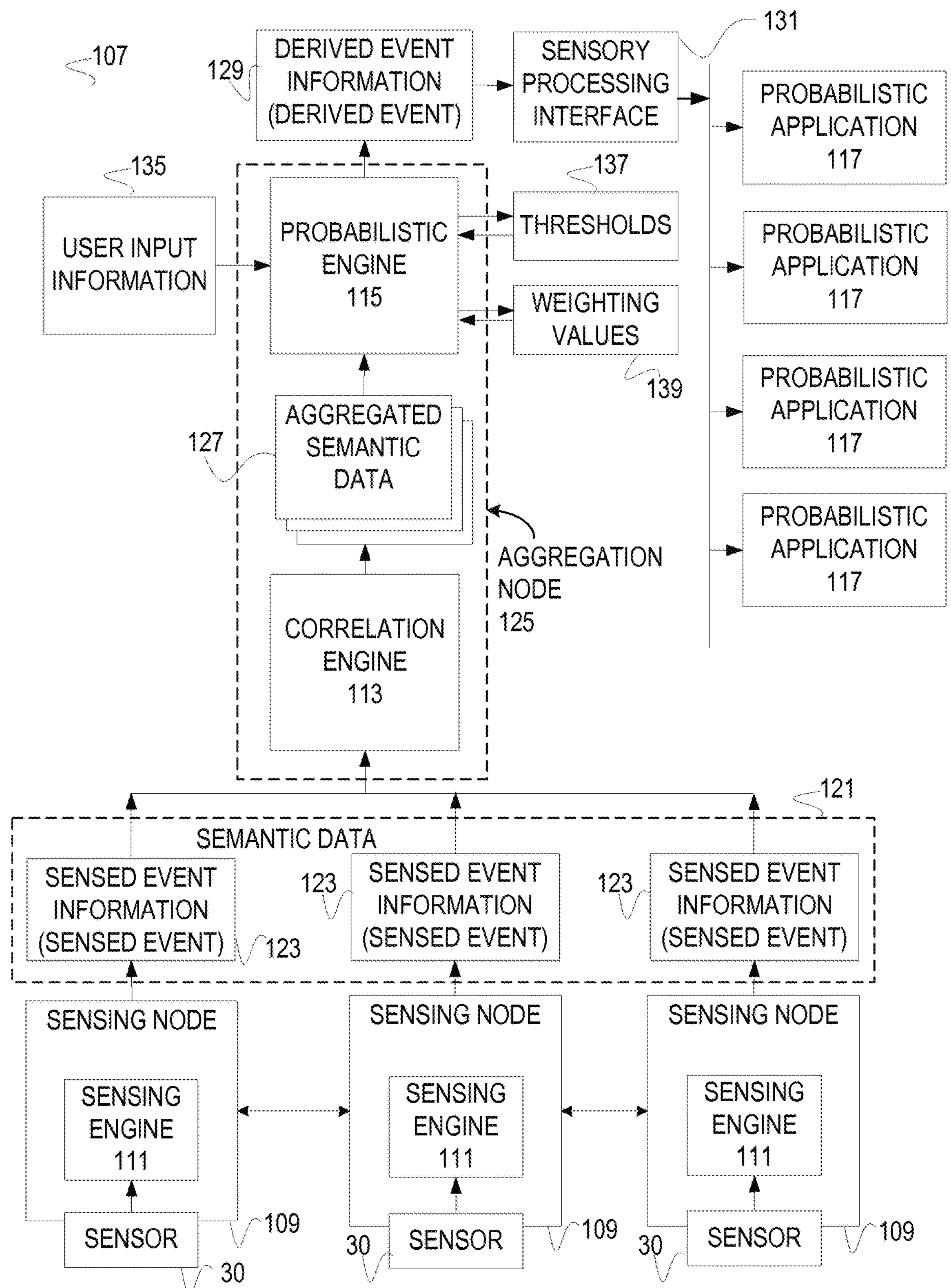
FIG. 3 is a block diagram illustrating a system, according to an embodiment, for probabilistic semantic sensing in a sensory network.

FIG. 3 is a block diagram illustrating a system 107, according to an embodiment, for probabilistic semantic sensing in a sensory network. The system 107 may include two or more sensing nodes 109, an aggregation node 125, and one or more probabilistic applications 117. Each of the sensing nodes 109 (e.g., machine) may include a sensing engine 111. Broadly, the sensing nodes 109 each include one or more sensors 30 for sensing raw sensor data that is communicated as raw sensor data to a sensing engine 111 that, in turn, processes the raw sensor data to produce semantic data 121. The semantic data 121 may include sensed event information 123 in the form of sensed events each including classifiers that classify the semantic data 121. The classifiers may include a semantic datum (not shown) that signifies the meaning of the raw sensor data as a discrete event including an expression of a binary state. For example, the binary state may be for a parking spot (e.g., occupied, vacant), a person (e.g., present, not present), a vehicle (e.g., present, not present). Additional classifiers may be associated with the semantic datum as discussed below.

The sensing nodes 109 may communicate the semantic data 121 to an aggregation node 125. The aggregation node 125 may include a correlation engine 113 and a probabilistic engine 115. Other embodiments may include multiple aggregation nodes 125. Sensing nodes 109 that sense the same underlying phenomena (e.g., parking spot #123) may communicate the semantic data 121 (sensed events) that represents the same underlying phenomena to the same aggregation node 125. Accordingly, some sensing nodes 109 may communicate with two or more aggregation nodes 125 based on the underlying phenomena that is being sensed and communicated by the sensing nodes 109. The aggregation node 125 may preferably be implemented in the cloud. Other embodiments may implement the correlation engine 113 and the probabilistic engine 115 on a sensing node 109, or another machine, or any combination of the like.

The correlation engine 113 receives the sensed event information 123 over a network (e.g., LAN, WAN, Internet, etc.) in the form of sensed events and correlates/aggregates the semantic data 121 based on the classifiers in each of the sensed events to generate aggregations of the semantic data 127. The aggregations of the semantic data 121 may be logically grouped. According to some embodiments, the correlation engine 113 may correlate and aggregate the semantic data 121 into aggregated semantic data 127 by constructing abstract graphs representing the relatedness of two or more semantic data 121 that is received from one or more sensing nodes 109 in the sensory network. The correlation engine 113 may construct the abstract graphs based on the similarity of semantic data 121 or based on other classifiers included in the sensed event. The correlation engine 113 may further construct the abstract graphs based on a relation between classifiers including spatial and temporal coordinates associated with each semantic datum. Merely for the example, the correlation engine 113 may correlate and aggregate all of the sensed events received from the sensing nodes 109 for a period of time that respectively include an assertion of an occupancy state of a particular parking spot (e.g., occupied, not occupied) in a parking lot and a probability as to the confidence of the assertion. Further for example, the correlation engine 113 may correlate and aggregate all of the sensed events received from the sensing nodes 109 for a period of time that respectively signify the presence of a person at a particular location in a parking lot (e.g., present, not present) and a probability as to the confidence of the assertion. The correlation engine 113 may construct the abstract graphs utilizing exact matching of the classifiers 141 (FIG. 4A), fuzzy matching of the classifiers 141, or a combination of both. According to some embodiments, the correlation engine 113 may correlate and aggregate the semantic data 121 into aggregated semantic data 127 based on mathematical relationships between locations of the sensors 30 and/or locations of the semantic datum (e.g., location of a parking spot that is being asserted as empty or occupied). For example, the correlation engine 113 may identify mathematical relationships between locations of the sensors 30, as expressed in spatial and temporal coordinates, and/or locations of the semantic datum (e.g., match, approximate match, etc.), as expressed in spatial and temporal coordinates.

The correlation engine 113 may communicate the aggregated semantic data 127 to the probabilistic engine 115 that, in turn, processes the aggregated semantic data 127 to produce derived event information 129 in the form of derived events. It will be appreciated by one having ordinary skill in the art that a sensory network may include multiple aggregation nodes 125 that communicate derived event information 129 to the same sensory processing interface 131. The probabilistic engine 115 processes the aggregated semantic data 127 by using relations of the individual probability of each semantic datum included in each sensed event together with external data inputs to compute a derived event with a derived probability. According to some embodiments, the external data inputs may include user inputs of desired accuracy, application inputs, or other user-defined desired parameters, as described further below. The probabilistic engine 115 processes a single aggregation of semantic data 127 to produce a single derived event. Accordingly, the probabilistic engine 115 may intelligently reduce the amount of data that, in turn, is passed along for further analysis. Merely for example, the amount of data in a single aggregation of semantic data 127 is reduced by the probabilistic engine 115 to a single derived event. Further, the probabilistic engine 115 may intelligently reduce the probabilities in an aggregation of semantic data 127 to produce a single derived event including a single derived probability. The probabilistic engine 115 may further produce the derived event information 129 based on thresholds 137 and weighting values 139. The probabilistic engine 115 may use the thresholds 137 associated with each semantic datum to determine the nature of a derived event. The initial determination of the threshold 137 may be heuristically defined or may be produced by any other less optimal process. The probabilistic engine 115 may alter the thresholds 137 based on the continued analysis of the probability of the semantic data 121 as signified by arrows illustrating the movement of the thresholds 137 both in and out of the probabilistic engine 115. The probabilistic engine 115 may alter the assignment of weights based on the continued analysis of the probability of the semantic data 121 as signified by arrows illustrating the movement of the weighting values 139 both in and out of the probabilistic engine 115. The probabilistic engine 115 may assign higher weighting values 139 to the semantic data 121 with higher probabilities or certainties. The probabilistic engine 115 may receive an initial weighting that is heuristically defined or produced by any other less optimal process. The probabilistic engine 115, in a stochastic process, may alter the assignment of weights based on the continued analysis of the probability of the semantic data 121 as signified by arrows illustrating the movement of the thresholds 137 both in and out of the probabilistic engine 115. According to some embodiments, the probabilistic engine 115 may utilize a derived probability for additional processing, or may communicate the derived probability, in a derived event, to the sensory processing interface 131 (e.g., application processing interface). The sensory processing interface 131 may be read by one or more probabilistic applications 117 (e.g., "APPLICATION W," "APPLICATION X," "APPLICATION Y,", "APPLICATION X,") that, in turn, process the derived event to enable the one or more applications to perform services.

FIG. 4A is a block diagram illustrating sensed event information 123, according to an embodiment. The sensed event information 123 may be embodied as a sensed event that is generated by a sensing node 109 and communicated to an aggregation node 125 where it is received by a correlation engine 113. The sensed event may include classifiers 141 that are used to characterize semantic data 121. Classifiers 141 may include a semantic datum, application identifier(s), a probability, a location of a sensor 30, a location of the semantic datum, and the like. The semantic datum classifier describes a discrete event that is sensed by a sensor 30 at a sensing node 109 and may include a semantic datum that expresses a binary state, as previously described (e.g., parking spot occupied or not occupied). The application identifier classifier may identify one or more probabilistic applications 117 that receive derived event information 129 generated based on the sensed event that contains the application identifier. The probability classifier describes the certainty or reliability of the sensed event, as asserted in the associated semantic datum. For example, a sensed event may include a semantic datum that a parking spot is empty with a probability of 99% indicating a 99% confidence that the parking spot is indeed empty. The location of the sensor classifier describes the location of the sensor 30 that sensed the associated semantic datum. The location of the sensor classifier may be embodied as spatial coordinates of the sensor 30 that sensed the associated semantic datum and as temporal coordinates indicating the date and time the associated semantic datum was sensed by the sensor 30. The location of the semantic datum classifier describes the location of the associated semantic datum. The location of the semantic datum classifier may be embodied as spatial coordinates of the associated semantic datum and temporal coordinates indicating the date and time the associated semantic datum was sensed by a sensor 30.

FIG. 4B is a block diagram illustrating derived event information 129, according to an embodiment. The derived event information 129 may be embodied as a derived event that is generated by a probabilistic engine 115 and communicated to a sensory processing interface 131. The derived event may include classifiers 143 that are used to characterize the derived event information 129. The meaning of the classifiers 143 in the derived event correspond to the meaning of the classifiers 141 in the sensed event, as previously described. The semantic datum classifier describes a discrete event that is sensed by one or more sensors 30 respectively located at sensing nodes 109 and may include a descriptor that expresses a binary state, as previously described (e.g., parking spot occupied or not occupied). In some instances, two or more sensors 30 may be located at the same sensing node 109. The application identifier classifier may identify one or more probabilistic applications 117 that receive the derived event information 129. The probability classifier in the derived event describes the certainty or reliability of the derived event, as asserted in the associated semantic datum. The probability classifier 143 may include a probability that is based on two or more sensed events, as determined by the probabilistic engine 115. For example, a derived event may include a semantic datum that a parking spot is empty with a probability of 99% that is based on two or more sensed events. The location of the sensor classifier describes the location of one or more sensors 30 that sensed the associated semantic datum. The location of the sensor classifier may be embodied as spatial coordinates of the one or more sensors 30 that sensed the associated semantic datum and as corresponding temporal coordinates indicating the date(s) and time(s) the associated semantic datum was sensed by the one or more corresponding sensors 30. The location of the semantic datum classifier describes the location of the associated semantic datum. The location of the semantic datum classifier may be embodied as spatial coordinates of the associated semantic datum and temporal coordinates indicating the date(s) and time(s) the associated semantic datum was sensed by the corresponding one or more sensors 30.

FIG. 5 is a block diagram illustrating user input information 135, according to an embodiment. The user input information 135 may include parameters or configuration values that are received by the probabilistic engine 115 and utilized by the probabilistic engine 115 to produce the derived event information 129. The user input information 135 may include desired accuracy information, application input information, and user preference information. The desired accuracy information may be received to identify a minimum level of raw sensor data that is required before a derived event is produced by the probabilistic engine 115. The application input information may be received to configure levels that are utilized for particular probabilistic applications 117. For example, a parking probabilistic application 117 may utilize a level that is configurable for making a decision whether or not a parking spot is empty. Configuring a level as low (e.g., 0) may force the probabilistic engine 115 to make a decision whether a parking spot is empty notwithstanding the quantity of aggregated semantic data 127 that is available for making a decision. Configuring a level higher (e.g., 1–X where X>0) may enable to the probabilistic engine 115 to report not enough information for a quantity of aggregated semantic data 127 that is lower than the configured level and empty (or not empty) for a quantity of aggregated semantic data 127 that is equal to or greater than the configured level. For example, reporting (e.g., sensed event) may include a semantic datum that indicates a parking space is "empty" (or not empty) or a semantic datum that indicates "not enough information."

Figure 6:
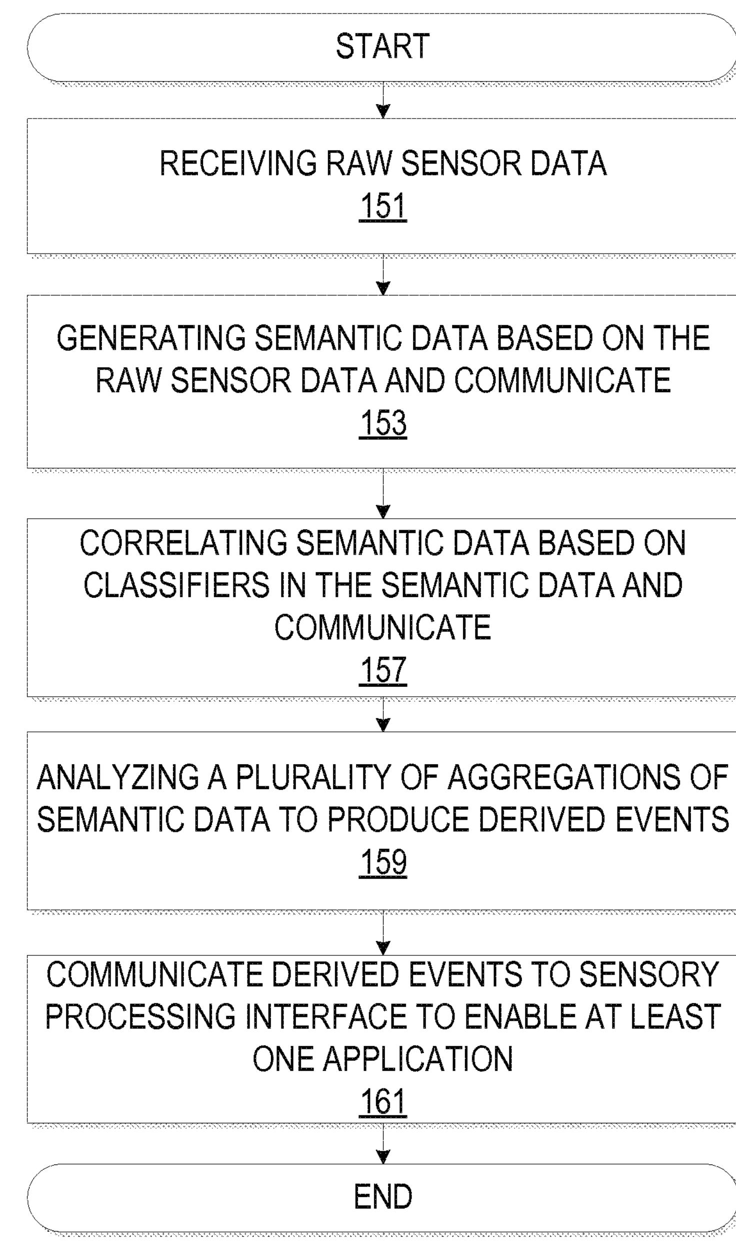
FIG. 6 is a block diagram illustrating a method, according to an embodiment, for probabilistic semantic sensing in a sensory network.

FIG. 6 is a block diagram illustrating a method 147, according to an embodiment, for probabilistic semantic sensing in sensory networks. The method 147 may commence at operation 151 with a light sensory network receiving raw sensor data. For example, the light sensory network may include two sensing nodes 109 respectively positioned at the top of two light poles respectively including two lights that illuminate a parking lot. The lights may be identified "LIGHT A" and "LIGHT B." The sensing nodes 109 may each include sensors 30 that receive the raw sensor data and a sensing engine 111 that processes the raw sensor data. The raw sensor data signifies the occupancy state of multiple parking slots in the parking lot. In one instance, the raw sensor data collected at each of the sensor nodes 19 signifies the same parking spot.

At operation 153, the sensing engine 111 generates semantic data 121 based on the raw sensing data. For example, the sensing engine 111 at each of the sensing nodes 109 may process the raw sensing data to generate semantic data 121 in the form of sensed event information 123 in the form of two sensed events. The sensing engine 111 at "LIGHT A" may generate a first sensed event including classifiers in the form of a semantic datum asserting a parking spot is empty, an application identifier that identifies a parking spot application, a probability of 95% that the asserted semantic datum is TRUE (e.g., the parking spot is indeed empty), coordinates that identify the location of the sensor 30 at "LIGHT A" that sensed the asserted semantic datum (e.g., latitude, longitude/global position system (GPS) coordinates, and the like), and coordinates that identify the location of the asserted semantic datum (e.g., latitude, longitude/GPS coordinates, and the like that identify the location of the parking spot). Further associated with the location coordinates of the sensor 30 is a classifier that specifies a date and time that the sensor 30 operated to acquire the semantic datum. Further associated with the location coordinates of the semantic datum is a classifier that specifies a date and time that the semantic datum was sensed by the sensor 30.

The sensing engine 111 at "LIGHT B" generates a second sensed event including classifiers 141 in the form of a semantic datum asserting the same semantic datum (e.g., a parking spot is empty), an application identifier that identifies a parking spot application, a probability of 85% that the asserted semantic datum is TRUE (e.g., the parking spot is indeed empty), coordinates that identify the location of the sensor 30 at "LIGHT B" that sensed the asserted semantic datum (e.g., latitude, longitude/GPS coordinates, and the like), and coordinates that identify the location of the asserted semantic datum (e.g., latitude, longitude/GPS coordinates, and the like that identify the location of the parking spot). Further associated with the location coordinates of the sensor 30 is a classifier 141 that specifies a date and time that the sensor 30 operated to acquire the semantic datum. Further associated with the location coordinates of the semantic datum is a classifier 141 that specifies a date and time that the semantic datum was sensed by the sensor 30.

Finally, the sensing engine 111 at "LIGHT A" communicates the above described first sensed event that was generated at "LIGHT A" over a network (e.g., LAN, WAN, Internet, etc.) to an aggregation node 125 where it is received by a correlation engine 113. Likewise, the sensing engine 111 at "LIGHT B" communicates the above described second sensed event that was generated at "LIGHT B" over a network (e.g., LAN, WAN, Internet, etc.) to the same aggregation node 125 where it is received by the correlation engine 113. It will be appreciated, by one having ordinary skill in the art, that other embodiments may include additional sensing nodes 109 that are utilized to sense the same parking spot. According to another embodiment, the aggregation node 125, including the correlation engine 113, may be located in a cloud. According to another embodiment, the correlation engine 113 may be located at a sensing node 109.

At operation 157, the correlation engine 113 may correlate the semantic data 121 based on classifiers 141 in the semantic data 121 to generate aggregations of the semantic data 121. The correlation engine 113 may continuously receive, in real time, the sensed events from multiple sensing nodes 109. The correlation engine 113 may correlate the sensed events based on based on classifiers 141 in sensed events to generate aggregates of semantic data 127. In the present example, the correlation engine 113 receives the first and the second sensed events and correlates the two together based on a selection of one or more classifiers 141 from a group of available classifiers. For example, the one or more classifiers 141 may include the semantic datum (e.g., a parking spot is empty) and/or application identifier(s) and/or coordinates that identify the location of the semantic datum being asserted. For example, the correlation engine 113 may correlate and aggregate the first sensed event and second sensed event together based on a matching semantic datum (e.g., a parking spot is empty) and/or a matching application identifier (e.g., identifies a parking spot application) and/or matching coordinates that identify the location of the asserted semantic datum (e.g., latitude, longitude/GPS coordinates, and the like that identify the location of the parking spot). Other classifiers 141 may be selected from the group of available classifiers for correlation and generation of aggregated semantic data 127 (e.g., aggregates of sensed events). Finally, at operation 157, the correlation engine 113 communicates the aggregated semantic data 127 to the probabilistic engine 115. According to one embodiment, the correlation engine 113 and the probabilistic engine 115 execute in an aggregation node 125 in the cloud. In another embodiment, the correlation engine 113 and the probabilistic engine 115 execute on different computing platforms and the correlation engine 113 communicates the aggregated semantic data 127 over a network (e.g., LAN, WAN, Internet, etc.) to the probabilistic engine 115.

At operation 159, the probabilistic engine 115 may analyze each of the aggregations of semantic data 127 to produce derived event information 129 (e.g., derived events). For example, the probabilistic engine 115 may analyze an aggregation of semantic data 127 including the first sensed event and the second sensed event to produce derived event information 129 in the form of a first derived event. The first derived event may include a probability of semantic datum classifier 143 (e.g., probability of 90% that a parking spot is empty) that is generated by the probabilistic engine 115 based on an aggregation of semantic data 127 including a probability of semantic datum classifiers 141 (e.g., probability of 85% that a parking spot is empty) included in the first sensed event and a probability of semantic datum classifier 141 included in the second sensed event (e.g., probability of 95% that the parking spot is empty). For example, the probabilistic engine 115 may average the probabilities of the two semantic data 141 (e.g., 85% and 95%) from the first and second sensed event to produce the (single) probability of semantic datum (e.g., 90%) for the first derived event. Other examples may include additional probabilities of semantic datum classifiers 141 as included in additional sensed events to produce the (single) probability of semantic datum 90% for the first derived event. The probabilistic engine 115 may utilize the user input information 135, thresholds 137, and weighting values 139, as previously described, to produce the derived event.

At operation 161, the probabilistic engine 115 may communicate the derived event information 129 to the sensory processing interface 131 to enable at least one probabilistic application 117. For example, the probabilistic applications 117 may read the derived event information 129 (e.g., derived events) from the sensory processing interface 131 and utilize the classifiers 143 in the derived events to perform services and generate reports. The services may include controlling devices inside or outside the sensory network and generating reports, as more fully described later in this document. For example, the probabilistic engine 115 may communicate the derived event information 129 in the form of the first derived event, over a network (e.g., LAN, WAN, Internet, etc.) to the sensory processing interface 131 that, in turn, is read by one or more probabilistic applications 117 (e.g., APPLICATION X) that utilize the first derived event to perform a service or generate a report. In one embodiment, the probabilistic engine 115 and the sensory processing interface 131 may be on the same computing platform. In another embodiment, the probabilistic engine 115 and the sensory processing interface 131 may be on different computing platforms.

According to some embodiments, the application of semantic data 121 and derived event information 129 may include the management or monitoring of the lighting capabilities. This type of probabilistic application 117 may involve classifiers 143 including the presence events of people, vehicles, other entities, and the associated alteration of illumination. This type of probabilistic application 117 may also include the determination of activity underneath or in the surrounding area of a node of the lighting network (including under or around the pole, wall, or other mounting object). This type of probabilistic application 117 may also include the detection of tampering or theft associated with the lighting infrastructure. In each case, the probabilities associated with each semantic datum may be limited by the location of sensors 30, the obstruction of the sensor field due to real-world obstructions, the limitations of lighting illumination, the availability of network bandwidth, or availability of computational power.

According to some embodiments, the probabilistic application 117 of semantic data 121 and derived event information 129 may include parking location and occupancy detection, monitoring, and reporting. This type of probabilistic application 117 may involve classifiers 141 and/or classifiers 143 including the presence and motion events of people, cars, and other vehicles. This type of probabilistic application 117 may also use classifiers 143 regarding people, cars, and other vehicles based on parameters of the car or vehicle, including its make, model, type, and other aesthetic features. In each case, the probabilities associated with each semantic datum may be limited by the location of sensors 30, the obstruction of the sensor field due to real-world obstructions including the parking locations of other vehicles or locations of other objects in the field of parking spaces, the limitations of lighting illumination, the availability of network bandwidth, or availability of computational power.

According to some embodiments, the probabilistic application 117 of semantic data 121 and derived event information 129 may include surveillance and reporting. This type of probabilistic application 117 may involve classifiers 141 and/or classifiers 143 including the detection of people or objects or the movement of people or objects. The goal of this type of probabilistic application 117 may be to increase the public safety or security of an area. In each case, the probabilities associated with each semantic datum may be limited by the location of sensors 30, the obstruction of the sensor field due to real-world obstructions, the limitations of lighting illumination, the availability of network bandwidth, or availability of computational power.

According to some embodiments, the probabilistic application 117 of semantic data 121 and derived event information 129 may include traffic monitoring & reporting. This type of probabilistic application 117 may involve classifiers 141 and/or classifiers 143 including presence and movement of people, cars, and other vehicles. This type of probabilistic application 117 may also classify people, cars, and other vehicles based on parameters of the car, including its make, model, type, and other aesthetic features. In each case, the probabilities associated with each semantic datum may be limited by the location of sensors 30, the obstruction of the sensor field due to real-world obstructions, the limitations of lighting illumination, the availability of network bandwidth, or availability of computational power.

According to some embodiments, the probabilistic application 117 of semantic data 121 and derived event information 129 may include retail customer monitoring and reporting. This type of probabilistic application 117 may involve classifiers 141 and/or classifiers 143 including the presence and movement of people, cars and other vehicles in a manner that may be useful to retailers. This type of probabilistic application 117 may also include the determination of trends regarding the use of a retail location. In each case, the probabilities associated with each semantic datum may be limited by the location of sensors 30, the obstruction of the sensor field due to real-world obstructions, the limitations of lighting illumination, the availability of network bandwidth, or availability of computational power.

According to some embodiments, the probabilistic application 117 of semantic data 121 and derived event information 129 may include business intelligence monitoring. This type of probabilistic application 117 involves classifiers 141 and/or classifiers 143 including the status of systems used by a business for operational purposes, facilities purposes, or business purposes, including the activity at points of sale (PoS) and other strategic locations. This type of probabilistic application 117 may also include the determination of trends regarding business intelligence. In each case, the probabilities associated with each semantic datum may be limited by the location of sensors 30, the obstruction of the sensor field due to real-world obstructions, the limitations of lighting illumination, the availability of network bandwidth, or availability of computational power.

According to some embodiments, the probabilistic application 117 of semantic data 121 and derived event information 129 may include asset monitoring. This type of probabilistic application 117 may involve classifiers 141 and/or classifiers 143 including the monitoring of high-value or otherwise strategic assets such as vehicles, stocks of supplies, valuables, industrial equipment, etc. In each case, the probabilities associated with each semantic datum may be limited by the location of sensors 30, the obstruction of the sensor field due to real-world obstructions, the limitations of lighting illumination, the availability of network bandwidth, or availability of computational power.

According to some embodiments, the probabilistic application 117 of semantic data 121 and derived event information 129 may include environmental monitoring. This type of probabilistic application 117 may involve classifiers 141 and/or classifiers 143 including those related to the monitoring of wind, temperature, pressure, gas concentrations, airborne particulate matter concentrations, or other environmental parameters. In each case, the probabilities associated with each semantic datum may be limited by the location of sensors 30, the obstruction of the sensor field due to real-world obstructions, the limitations of lighting illumination, the availability of network bandwidth, or availability of computational power. In some embodiments, environmental monitoring may include earthquake sensing.

Lighting Infrastructure Application Framework

This disclosure further relates to the use of street or other lighting systems as a basis for a network of sensors 30, platforms, controllers and software enabling functionality beyond lighting of outdoor or indoor spaces.

Industrialized countries throughout the world have extensive networks of indoor and outdoor lighting. Streets, highways, parking lots, factories, office buildings, and all types of facilities often have extensive indoor and outdoor lighting. Substantially all of this lighting until recently uses incandescent or high intensity discharge (HID) technology. Incandescent or HID lighting, however, is inefficient in conversion of electrical power to light output. A substantial fraction of the electrical power used for incandescent lighting is dissipated as heat. This not only wastes energy, but also often causes failure of the light bulbs themselves, as well as of the lighting apparatus.

As a result of these disadvantages, and the operating and maintenance cost efficiencies of light emitting diodes or other solid-state lighting technologies, many owners of large numbers of incandescent or HID light fixtures are converting them to use solid-state lighting. Solid-state lighting not only provides for longer life bulbs, thereby reducing labor costs for replacement, but the resulting fixtures also operate at low temperatures for longer periods, further reducing the need to maintain the fixtures. The assignee of this application provides lighting replacement services and devices to various municipalities, commercial and private owners, enabling them to operate their facilities with reduced maintenance costs and reduced energy costs.

We have developed a networked sensor and application framework for deployment in street or other lighting systems. The architecture of our system allows deployment of a networked system within the lighting infrastructure already in place, or at the time of its initial installation. While the system is typically deployed in outdoor street lighting, it also can be deployed indoors, for example, in a factory or office building. Also, when the system is deployed outdoors, it can be installed at a time when street lamp bulbs are changed from incandescent lighting to more efficient lighting, for example, using light emitting diodes (LEDs). The cost of replacing such incandescent bulbs is high, primarily due to the cost of labor and the necessity to use special equipment to reach each bulb in each street lamp. By installing the network described here at that time, the incremental cost vis-a-vis merely replacing the existing incandescent bulb with an LED bulb is minimal.

Because our system enables numerous different uses, we refer to the deployed network, sensors 30, controller and software system described here as a Lighting Infrastructure Application Framework (LIAF). The system uses lighting infrastructure as a platform for business and consumer applications implemented using a combination of hardware and software. The main components of the framework are the node hardware and software, sensor hardware, site specific or cloud based server hardware, network hardware and software and wide-area network resources that enable data collection, analysis, action invocation and communication with applications and users.

It will be appreciated, by one having skill in the art, that the LIAF may be utilized to embody methods and systems for probabilistic semantic sensing, as previously described, and more particularly probabilistic semantic sensing in a light sensory network. Although the systems described here are in the context of street lighting, it will be evident from the following description that the system has applicability to other environments, for example, in a parking garage or factory environment.

In one embodiment, our system provides for a network of lighting systems using existing outdoor, parking structure and indoor industrial lights. Each light can become a node in the network, and each node includes a power control terminal for receiving electrical power, a light source coupled to the power control terminal, a processor coupled to the power control terminal, a network interface coupled between the processor and the network of lighting systems, and sensors 30 coupled to the processor for detecting conditions at the node. In some applications as described below, the network does not rely on a lighting system. In combination, our system allows each node to convey information to other nodes and to central locations about the conditions at the nodes. Processing can therefore be distributed among the nodes in the LIAF.

We use a gateway coupled to the network interface of some LIAF nodes for providing information from the sensors 30 at the nodes to a local or cloud based service platform where application software stores, processes, distributes and displays information. This software performs desired operations related to the conditions detected by the sensors 30 at the nodes. In addition, the gateway can receive information from the service platform and provide that information to the each of the node platforms in its domain. That information can be used to facilitate maintenance of the light, control of the light, control cameras, locate unoccupied parking spaces, measure carbon monoxide levels or numerous other applications, several typical ones of which are described herein. The sensors 30 collocated or in the proximity of the nodes can be used with controllers to control the light source, as well as to provide control signals to apparatus coupled to the node, e.g. lock or unlock a parking area. Multiple gateways can be used to couple multiple regions of the lighting system together for purposes of a single application.

Typically, each node will include alternating current (AC)/direct current (DC) converters to convert the supplied AC power to DC for use by the processor, sensors 30, etc. The gateways can communicate with each other through cellular, Wi-Fi or other means to the service platforms. The sensors 30 are typically devices which detect particular conditions, for example, audio from glass breaking or car alarms, video cameras for security and parking related sensing, motion sensors, light sensors, radio frequency identification detectors, weather sensors or detectors for other conditions.

In another embodiment, we provide a network of sensors 30 for collecting information by using existing lighting systems having fixtures with light sources. The method includes replacing the light source at each fixture with a module that includes a power control terminal connected to the power supply of the existing light fixture, a replacement light source, a processor, a network interface coupled to the processor, and sensors 30 coupled to the processor. The sensors 30 detect conditions at and around the node, and forward information about that condition to the processor. Preferably, the network interface of each module at each fixture is commonly coupled together using a broadband or cellular communications network. Using the communication network, information is collected from the sensors 30, and that information is provided over the network to an application running on local servers at a site or servers in the cloud. A local or site based application server is referred to as Site Controller. Applications running on a Site Controller can manage data from one or more specific customer sites.

In one embodiment, each module at each of the fixtures includes a controller and apparatus coupled to the controller, and the controller is used to cause actions to be performed by the apparatus. As mentioned above, signals can be transmitted from the computing device over the communication network to the modules and thereby to the controllers to cause an action to be performed by the apparatus of the lighting system.

The lighting infrastructure application framework described here is based on node, gateway and service architectures. The node architecture consists of a node platform which is deployed at various locations in the lighting infrastructure, e.g. at individual street light fixtures. At least some of the nodes include sensors 30 that collect and report data to other nodes and, in some cases, to higher levels in the architecture. For example, at the level of an individual node an ambient light sensor can provide information about lighting conditions at the location of the lighting fixture. A camera can provide information about events occurring at the node.

Figure 7:
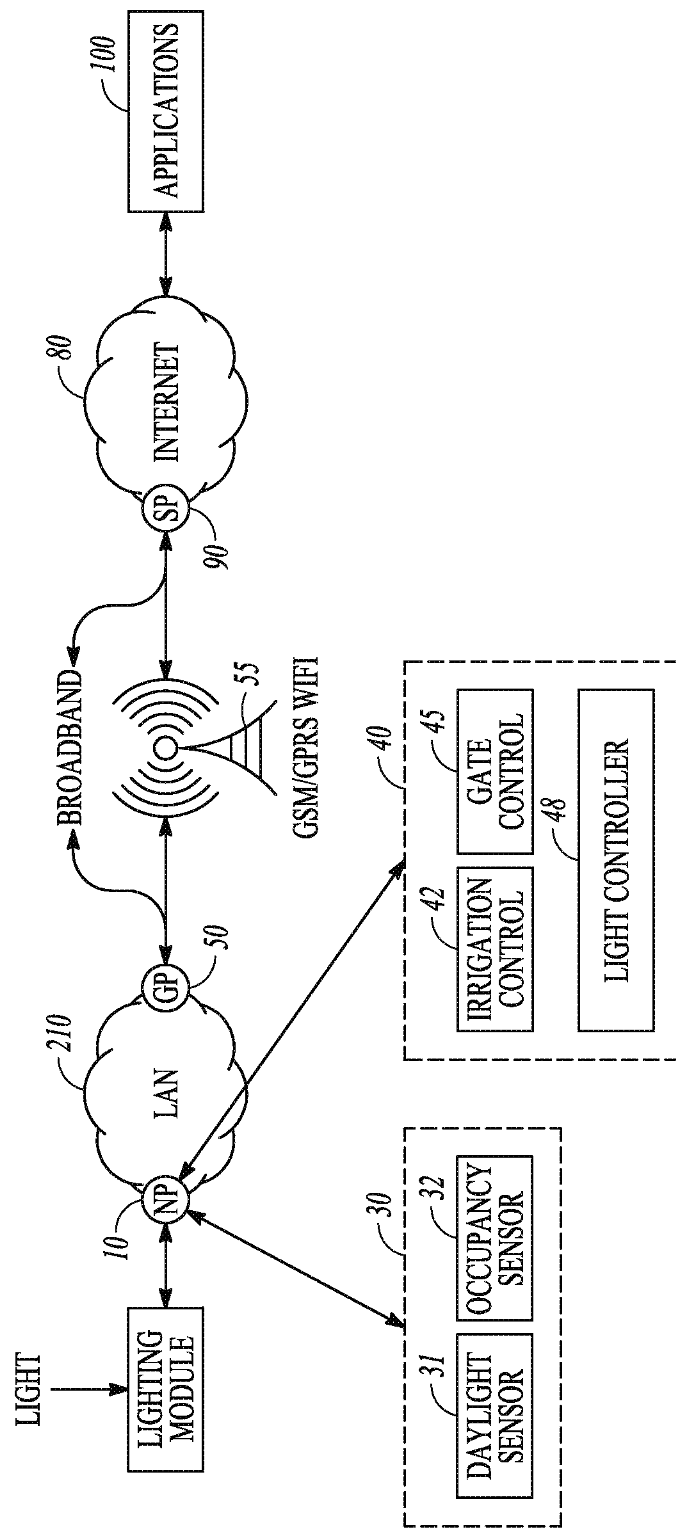
FIG. 7 illustrates a portion of the overall architecture of a lighting infrastructure application framework (LIAF), according to an embodiment.

FIG. 7 illustrates a portion of the overall architecture of our system. As shown there, a lighting node includes a node platform 10 (e.g., "NP") (e.g., sensing node 109) in addition to the light source itself. The node platform 10 includes sensors 30 of various types as selected by the owner of the lighting node, depending upon the particular application desired. In the illustration, a daylight sensor 31 and an occupancy sensor 32 are depicted. The lighting node may also include controllers 40 for performing functions in response to the sensors 30, or performing functions in response to control signals received from other sources. Three exemplary controllers 40 are illustrated in the diagram, namely an irrigation control 42 for controlling an irrigation system, a gate control 45 for opening and closing a nearby gate, and a light controller 48. The light controller 48 can be used to control the lighting source in a node platform 10, for example, turning it off or on at different times of the day, dimming it, causing it to flash, sensing the condition of the light source itself to determine if maintenance is required, or providing other functionality. The sensors 30, controllers 40, power supply, and other desired components can be collectively assembled into a housing of the node platform 10.

Other examples of control functions which these or similar controllers 40 enable include: management of power distribution, measurement and monitoring of power, and demand/response management. The controllers 40 can activate and deactivate sensors 30, and can measure and monitor the sensor outputs. In addition, the controllers 40 provide management for communication functions such as gateway operation for software downloading and security administration, and for video and audio processing, for example detection or monitoring of events.

In the one embodiment the architecture of our networked system enables "plug-and-play" deployment of sensors 30 at the lighting nodes. The lighting infrastructure application framework (LIAF) provides hardware and software to enable implementation of the sensor plug-and-play architecture. When new sensors 30 are deployed, software and hardware manages the sensor 30, but the LIAF provides support for generic functions associated with the sensors 30. This can reduce or eliminate the need for custom hardware and software support for sensors 30. A sensor 30 may require power, typically battery or wired low voltage DC, and preferably the sensor 30 generates analog or digital signals as output.

The LIAF allows deployment of sensors 30 at lighting nodes without additional hardware and software components. In one implementation, the LIAF provides DC power to sensors 30. It also monitors the analog or digital interface associated with the sensor 30, as well as all other activities at the node.

The node platforms 10 located at some of the lights are coupled together to a gateway platform 50 (e.g., "GP") (e.g., aggregation node 125). The gateway platform 50 communicates with the node platform 10 using technology as described further below, but can include a wireless connection or a wired connection. The gateway platform 50 will preferably communicate with the Internet 80 using well-known communications technology 55 such as cellular data, Wi-Fi, GPRS, or other means. Of course, the gateway platform 50 does not need to be a stand-alone implementation. It can be deployed at a node platform 10. The gateway platform 50 provides wide area networking (WAN) functionality and can provide complex data processing functionality, in addition to the functions provided by the node platform 10.

The gateway platform 50 establishes communications with a service platform 90 (e.g., "SP") enabling the node to provide data to, or receive instructions from, various applications 100 (e.g., probabilistic application 117). Service platform 90 is preferably implemented in the cloud to enable interaction with applications 100 (e.g., probabilistic application 117). When a service platform 90 or a subset of the functionality is implemented locally at a site, then it is referred to as site controller. Associated with the service platform 90 are a variety of applications 100 (e.g., probabilistic applications 117) that offer end-user accessible functions. Owners, partners, consumers, or other entities can provide these applications 100. One typical application 100, for example, provides reports on current weather conditions at a node. The applications 100 are usually developed by others and licensed to the infrastructure owner, but they can also be provided by the node owner, or otherwise made available for use on various nodes.

Typical lighting related applications 100 include lighting control, lighting maintenance, and energy management. These applications 100 preferably run on the service platform 90 or site controller. There also can be partner applications 100—applications 100 that have access to confidential data and to which the lighting infrastructure owners grant privileges. Such applications 100 can provide security management, parking management, traffic reporting, environment reporting, asset management, logistics management, and retail data management to name a few possible services. There are also consumer applications 100 that enable consumers to have access to generic data, with access to this data granted, for example, by the infrastructure owner. Another type of application 100 is owner-provided applications 100. These are applications 100 developed and used by infrastructure owners, e.g. controlling traffic flow in a region or along a municipal street. Of course there can also be applications 100 that use customized data from the framework.

The primary entities involved in the system illustrated in FIG. 7 are a lighting infrastructure owner, an application framework provider, an application 100 or application service owner, and end users. Typical infrastructure owners include a municipality; a building owner, tenants, an electric utility, or other entities.

Figure 8:
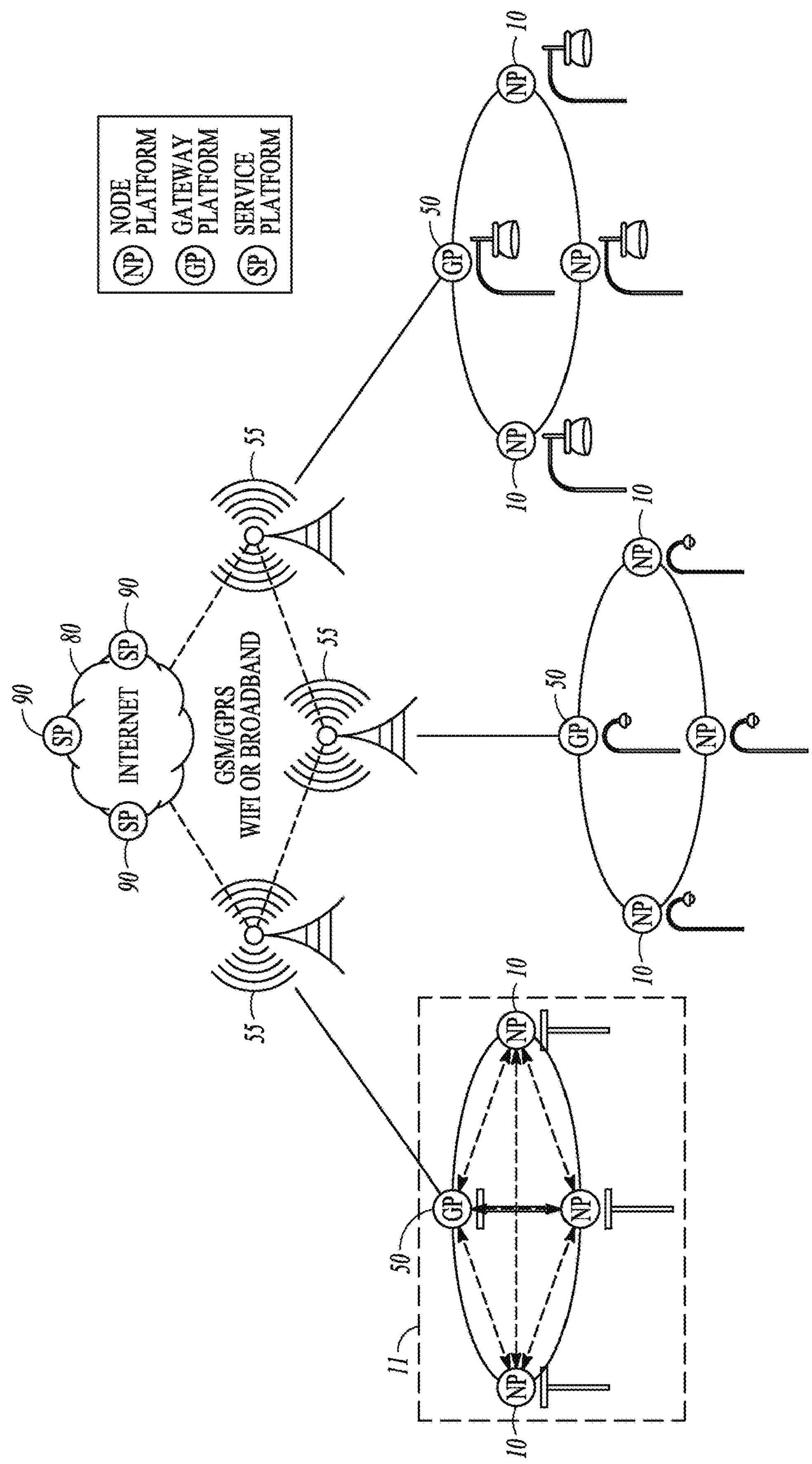
FIG. 8 illustrates the architecture of a system, according to an embodiment, at a higher level.

FIG. 8 is a diagram that illustrates the architecture of our system at a higher level. As shown in FIG. 8, groups of node platforms 10 communicate with each other and to a gateway platform 50. The gateway communicates, in turn, through communication media 55 to the Internet 80. In a typical implementation as illustrated, there will be multiple sets of nodes 10, multiple gateway platforms 50, multiple communication media 55, all commonly coupled together to the service platforms 90 available through the Internet 80. In this manner, multiple applications 100 can provide a wide degree of functionality to individual nodes through the gateways in the system.

FIG. 8 also illustrates the networking architecture for an array of nodes. In the left-hand section 11 of the drawing, an array of nodes 10 are illustrated. Solid lines among the nodes represent a data plane, which connects selected nodes to enable high local bandwidth traffic. These connections, for example, can enable the exchange of local video or data among these nodes. The dashed lines in section 11 represent a control plane, which connects all of the nodes to each other and provides transport for local and remote traffic, exchanging information about events, usage, node status, and enabling control commands from the gateway, and responses to the gateway, to be implemented.

Figure 9:
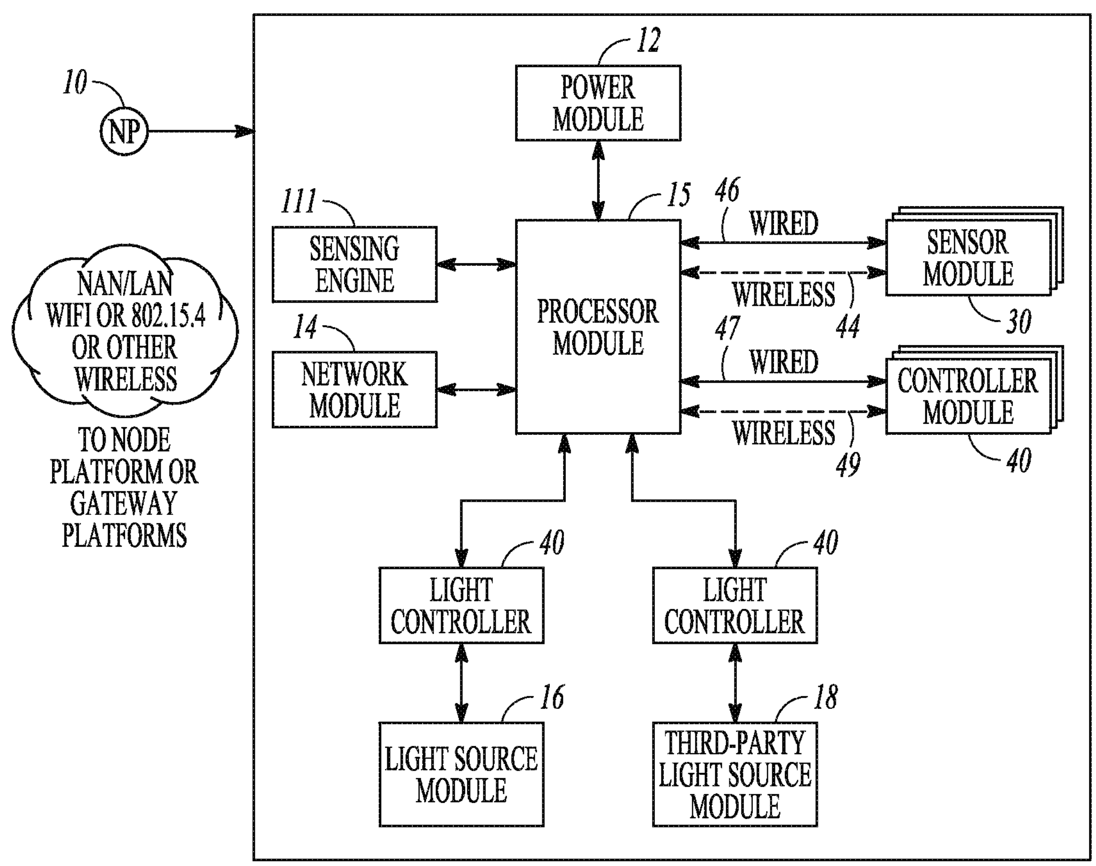
FIG. 9 is a block diagram of a node platform, according to an embodiment.

FIG. 9 illustrates the node platform 10 in more detail. The node infrastructure includes a power module 12, typically implemented as an AC to DC converter. In one implementation, where the nodes are deployed at outdoor street lamps, AC power is the primary power supply to such street lamps. Because most of the sensors 30 and controller 40 structures use semiconductor-based components, power module 12 converts the available AC power to an appropriate DC power level for driving the node components.

As also shown in FIG. 9, the array of sensors 30 and controllers 40 are connected to the power module 12 which can include an AC/DC converter as well as other well-known components. A processor running processor module 15 coordinates operation of the sensors 30 and controllers 40, to implement the desired local functionality, including the operation of the sensing engine 111, as previously described. The processor module 15 also provides communication via appropriate media to other node platforms 10. The application 100 may also drive an light source module 16, coupled to an appropriate third-party light source module 18, operating under control of one of the controllers 40. An implementation might combine the power module 12 and the light controller 48 functionality into a single module. As indicated by the diagram, wired 46 and 47 connections and wireless 44 and 49 connections may be provided as desired.

In FIG. 9, the lighting infrastructure consists of a light source module 16, 18, e.g. an LED assembly such as those commercially available from the assignee Sensity Systems Inc. Of course, third-party manufacturers can provide the third-party light source module 18 as well as other components. The module 16 may also be coupled to a controller 40. The sensors 30 associated with the nodes may be local to the node, or they can be remote. Controllers 40, other than the LED controller provided by the assignee Sensity Systems Inc., are typically remote and use wireless communications. A processor module 15, also referred to as a node application controller, manages all the functions within the node. It also implements the administrative, data collection and action instructions associated with applications 100. Typically these instructions are delivered as application scripts to the controller 40. In addition, the software on the application controller provides activation, administration, security (authentication and access control) and communication functions. The network module 14 provides radio frequency (RF) based wireless communications to the other nodes. These wireless communications can be based on neighborhood area network (NAN), WiFi, 802.15.4 or other technologies. The sensor module may be utilized to operate the sensors 30. The processor module 15 is further illustrated as being communicatively coupled to a sensing engine 111 which operates as previously described.

Figure 10:
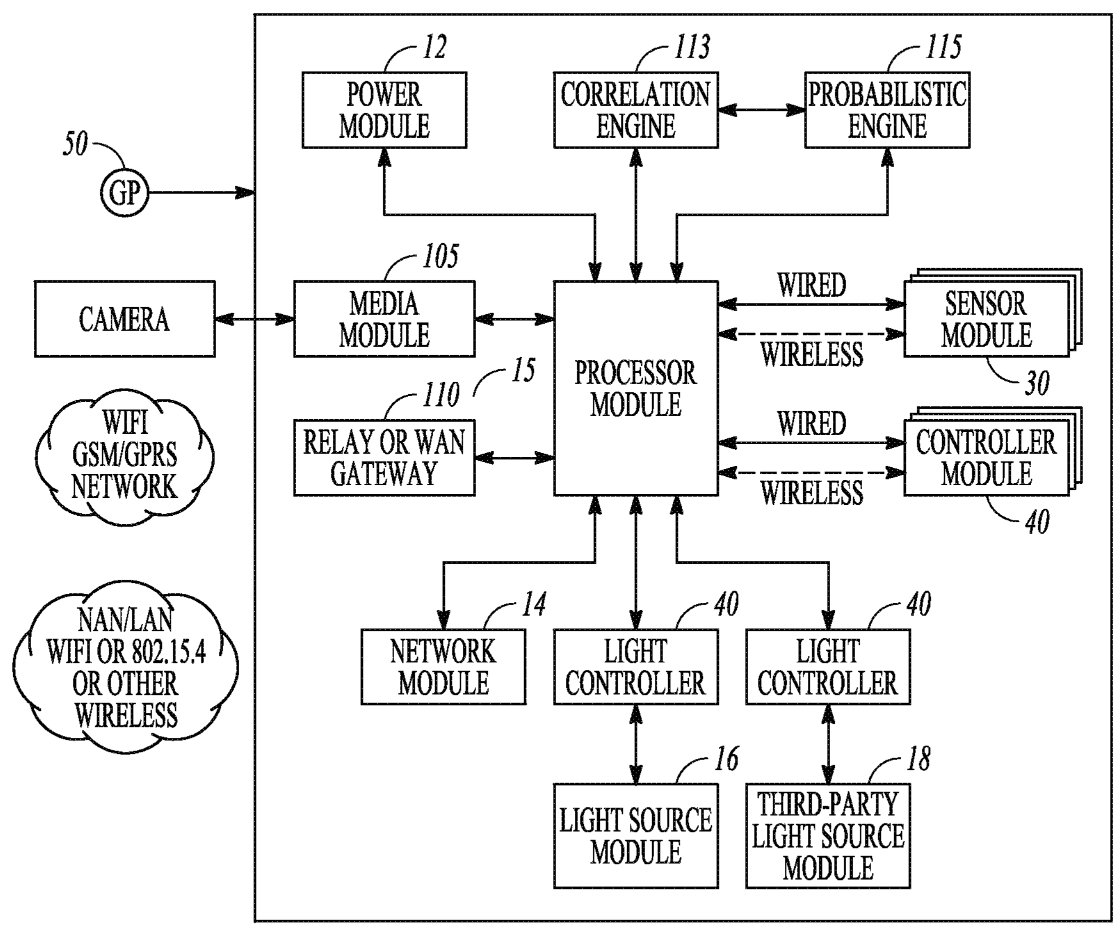
FIG. 10 is a block diagram of a gateway platform, according to an embodiment.

FIG. 10 is a block diagram of gateway platform 50. As suggested by the figure, and mentioned above, the gateway platform 50 can be located at a node or located in its own housing separately from the nodes. In the diagram of FIG. 10, the components of the power module 12, processor module 15, LED light source module 16 and third-party light source module 18 are shown again, as well as the sensor modules 30 and controller modules 40. Further illustrated are a correlation engine 113 and a probabilistic engine 115, that both operate as previously described.

The gateway platform 50 hardware and software components enable high bandwidth data processing and analytics using media module 105, e.g. at video rates, as well as relay or WAN gateway 110, in addition to the functions supported by the node platform 10. The gateway platform 50 can be considered a node platform 10 but with additional functionality. The high bandwidth data processing media module 105 supports video and audio data processing functions that can analyze, detect, record and report application specific events. The relay or WAN gateway 110 can be based on GSM, Wi-Fi, LAN to Internet, or other wide area networking technologies.

Figure 11:
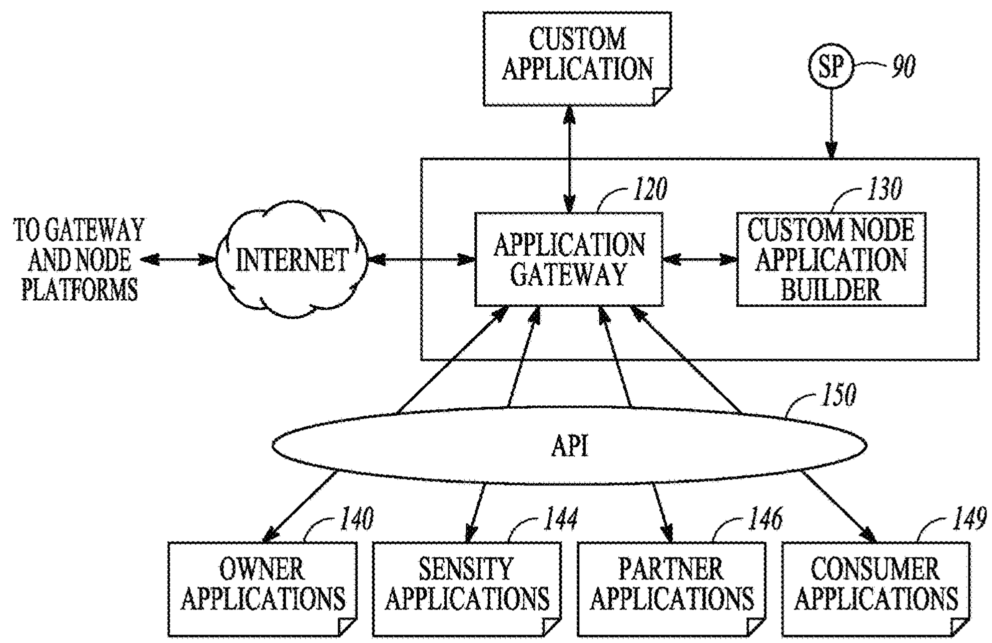
FIG. 11 is a block diagram of a service platform, according to an embodiment.

FIG. 11 is a block diagram of the service platform 90. The service platform 90 supports the application gateway 120 and a custom node application builder 130. The application gateway 120 manages interfaces to different types of applications (e.g., probabilistic application 117) implemented using the sensor and event data from the lighting nodes. A service platform 90 with application gateway 120 (e.g., sensory processing interface 131, according to one embodiment) can be deployed as site controller at a customer lighting site. A site controller therefore is an instance of service platform 90 with just the application gateway 120 functionality. The custom node application builder 130 allows development of custom node application scripts (e.g., probabilistic application 117). These scripts specify to the processor module 15 (see FIG. 9), data collection instructions and operations to be performed at the node level. The scripts specify to the application gateway 120 how the results associated with the script are provided to an application (e.g., probabilistic application 117).

FIG. 11 also illustrates that owner applications 140 (e.g., probabilistic applications 117), sensity applications 144 (e.g., probabilistic applications 117), partner applications 146 (e.g., probabilistic applications 117), and consumer applications 149 (e.g., probabilistic application 117) utilize the application gateway API 150 (e.g., sensory processing interface 131, according to one embodiment). The assignee hereto has developed and implements various types of applications (e.g., probabilistic applications 117) common to many uses of the sensors 30. One such application 100 is lighting management. The lighting management application provides lighting status and control functionality for the light source at a node platform 10. Another application (e.g., probabilistic application 117) provided by the assignee provides for lighting maintenance. The lighting maintenance application allows users to maintain their lighting network, for example, by enabling monitoring the status of the light(s)

at each node. An energy management application (e.g., probabilistic application 117) allows users to monitor lighting infrastructure energy usage and therefore to better control that use.

The partner applications 146 shown in FIG. 11 are typically assignee-approved applications and application services companies that have established markets for various desired functions, such as those listed below. These applications 100 utilize the application gateway API 150. Typical partner applications 146 provide security management, parking management, traffic monitoring and reporting, environment reporting, asset management, and logistics management.

Consumer applications 149 utilize application gateway API 150 to provide consumer related functionality. This API 150 provides access to publicly available, anonymous and owner-approved data. Also shown are owner applications 140 developed and used by lighting infrastructure owners to meet their various specific needs.

Figure 12:
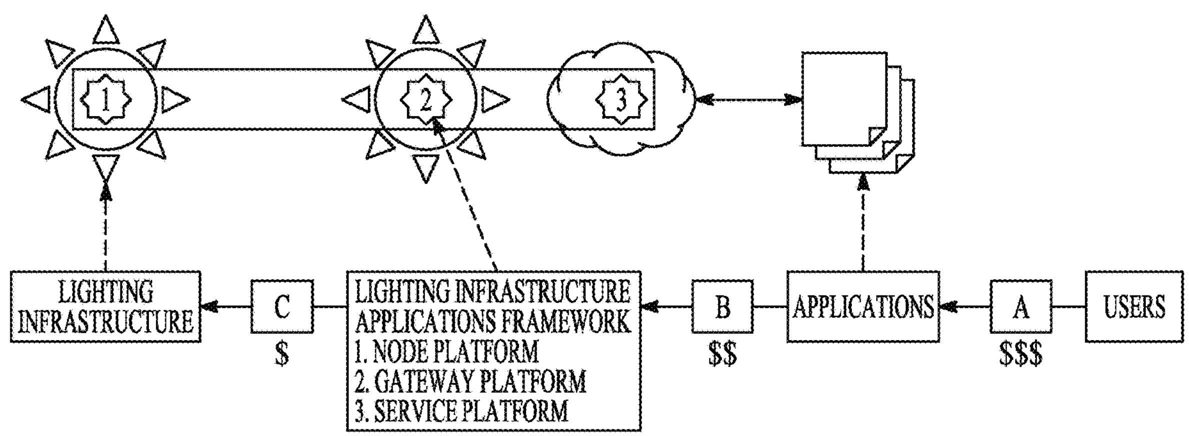
FIG. 12 is a diagram illustrating a revenue model, according to an embodiment, for lighting infrastructure applications.

FIG. 12 illustrates the lighting infrastructure applications revenue model for the system described above. This revenue model illustrates how revenue is generated and shared among the key stakeholders in the lighting infrastructure. In general, application 100 and/or application service providers collect revenue A from application users. Application 100 owners or service providers pay a fee B to the lighting infrastructure application framework service provider. The LIAF service provider pays fees C to the lighting infrastructure owners.

Key stakeholders of the lighting infrastructure based applications 100 include the owners of the lighting infrastructure. These are the entities that own the light-pole/fixture and the property on which the lighting infrastructure is located. Another key party involved with the system is the LIAF service provider. These are the entities that provide hardware and software platforms deployed to provide the data and services for the applications 100. The assignee herein is a service provider for the LIAF. Other important entities include the application (e.g., probabilistic application 117) developers and owners. These entities sell applications 100 or application services. These applications 100 and service providers are based on the data collected, processed and distributed by the LIAF.

Among the revenue sources for funding the LIAF are applications, application services and data. There are revenue options for application 100 or application service providers. Users of an application 100 or the application services, pay a license fee that is typically either time interval based or paid as a one-time license fee. This fee is based on different levels of usage, for example, standard, professional, and administrator. The usage fee also can be dependent on the type of data, e.g. raw or summarized, real-time vs. non real-time, access to historical data, based on data priced dynamically by demand, and on the location associated with data.

Another application service includes advertisers. These are businesses that want to advertise products or services to applications 100 and application-service users. Such advertisers pay advertisement fees for each application 100 or service.

With regard to data, application 100 and application service developers make payments for accessing data. Data includes specific data, e.g. energy usage at a node, on a per light engine basis for the entire light, on a per light engine channel, or per sensor 30. Another type of data is the status of a light, e.g. administrative status such as temperature threshold or energy cost to trigger dimming, dimming percentage, reporting of light status including setting of detection interval and reporting interval. This data can also include operational status such as present status of light, on or off, dimmed and dimming amount, failed, abnormal, etc. Other types of data include environmental data, e.g. temperature, humidity and atmospheric pressure at the node; or lighting data such as ambient light and its color.

The nodes may also sense and provide numerous other types of data. For example, gases such as carbon dioxide, carbon monoxide, methane, natural gas, oxygen, propane, butane, ammonia, or hydrogen sulfide can be detected and data reported. Other types of data include accelerometer status indicating seismic events, intrusion detector status, Bluetooth.RTM. .sup.1 media access control (MAC)_ address, active radio frequency identification (RFID) tag data, ISO-18000-7, and DASH 7 data. Below we describe some of these applications 100 and the data they can collect in more detail.

Application specific sensor data can include an intrusion sensor to detect intrusion at the base of the pole or the light fixture, unauthorized opening of a cover at the base of pole, unauthorized opening of the light fixture, a vibration sensor for intrusion related vibration detection, earthquake related vibration detection or pole damage related vibration detection. A motion sensor can detect motion, its direction, and the type of motion detected.

Audio sensors can provide another type of collectable data. Audio sensors can detect glass breaking, gunshots, vehicle engines' on-or-off events, tire noise, vehicle doors closing, a human communication event, or a human distress noise event.

People detection sensors can detect a single person, multiple people, and count of people. Vehicle detection can include single vehicle, multiple vehicles, and the duration of sensor visibility. The vehicle detection can provide a vehicle count, or recognition information regarding make, model, color, license plate etc.

Our system can also provide data regarding correlated events, often by using data from multiple sensors 30. For example, sensor data from a motion detector, and a people detector can be combined to activate a lighting function to turn on, off, dim or brighten lights. A count of people with motion detection provides information about security, retail activity or traffic related events. Motion detection coupled with vehicle detection can be used to indicate a breach in security of a facility.

Use of combinations of sensors 30, such as motion and vehicle count or motion and audio, provides useful information for performing various actions. The time of data collection can also be combined with data from sensors 30 such as those discussed above to provide useful information, e.g. motion detection during open and closed hours at a facility. Light level sensors coupled to motion detection sensors can provide information useful for lighting control. Motion detection can be combined with video to capture data only when an event occurs. Current and historical sensor data can be correlated and used to predict events or need for adjustment of control signals, e.g. traffic flow patterns.

Another use for data collected at the nodes is aggregation. This allows data events to be used to generate representative values for a group using a variety of techniques. For example, aggregated data can be used to collect information about luminaire types at a site (e.g. post-top and wall-pack luminaires); environmentally protected vs. unprotected luminaires; or luminaires outside exposed areas. Data can be collected based on light area (e.g. pathway, parking lot, driveway), facility type (e.g. manufacturing, R&D), corporate region (e.g. international vs. domestic), etc.

Power usage can be aggregated for fixture type, facility, facility type, or geographical region. Environment sensing related aggregation can be provided for geographical areas or facility types. Security applications include aggregations for geographical area or facility type. Traffic applications include aggregations by time-of-day, week, month, year or by geographical area (e.g. school area vs. retail area). Retail applications include aggregations by time of day, week, month, etc., as well as by geographical area or facility type. Data can also be filtered or aggregated based on user-specified criteria, e.g. time of day.

Custom application development allows users to specify data to be collected and forwarded to the custom applications 100 and services; actions to be performed based on the data at the lighting nodes; the format of the data that will be forwarded to applications 100 or application services; and management of historical data.

Our revenue distribution model allows for revenue sharing among lighting infrastructure owners, application infrastructure owners, and application 100 or application service owners. Today, for infrastructure owners, lighting is a cost center involving capital investment, energy bills and maintenance costs. Here the assignee provides the hardware, software and network resources to enable applications 100 and application services on a day-to-day basis, allowing the infrastructure owner to offset at least some of the capital, operational, and maintenance expenses.

Figure 13:
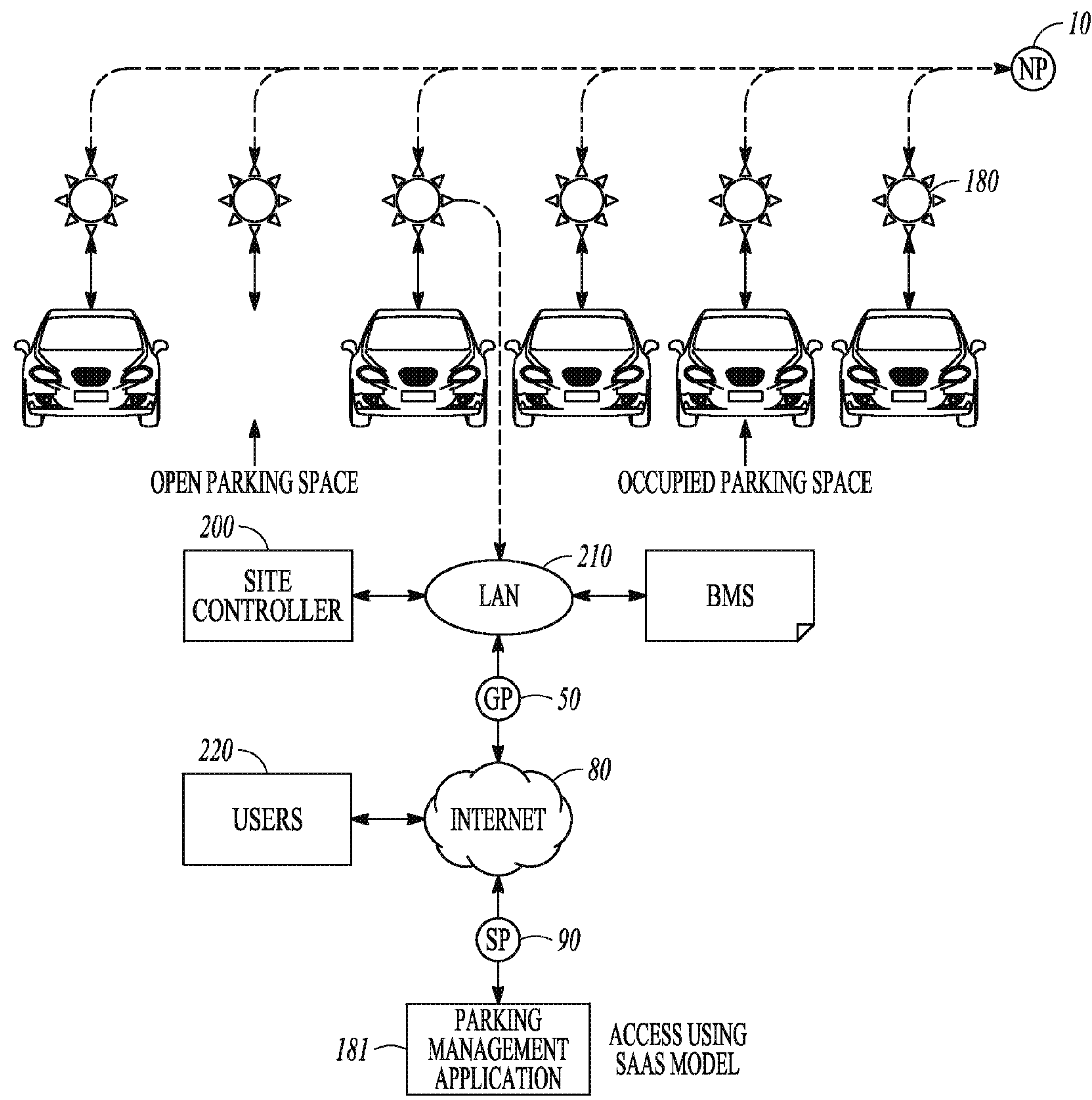
FIG. 13 illustrates a parking garage application, according to an embodiment, for a networked lighting system.

FIGS. 13-16 illustrate four sample applications 100 for the system described above. FIG. 13 illustrates a parking management application 181 (e.g., probabilistic application 117). A series of vehicle detection sensors 180 are positioned one above each parking space in a parking garage, or a single multi-space occupancy detection sensor is positioned at each light. The sensors 180 can operate using any well-known technology that detects the presence or absence of a vehicle parked underneath them. When a parking space specific sensor 180 is deployed, then each sensor 180 includes an LED that displays whether the space is open, occupied, or reserved. This enables a driver in the garage to locate open, available and reserved spaces. It also allows the garage owner to know when spaces are available without having to visually inspect the entire garage. The sensors 180 are coupled using wired or wireless technology to a node platform 10, such as described for the system above. The node platform 10 communicates to a site controller 200 via a local area network (LAN) 210 and/or to a service platform 90 using the gateway platform 50. The gateway platform 50 is connected to the service platform 90 via the Internet 80 and to users 220. The site controller 200 can communicate with the service platform 90 or parking management application 181. The parking management application 181 enables users 220 to reserve spaces by accessing that application 181 over the Internet 80.

Figure 14:
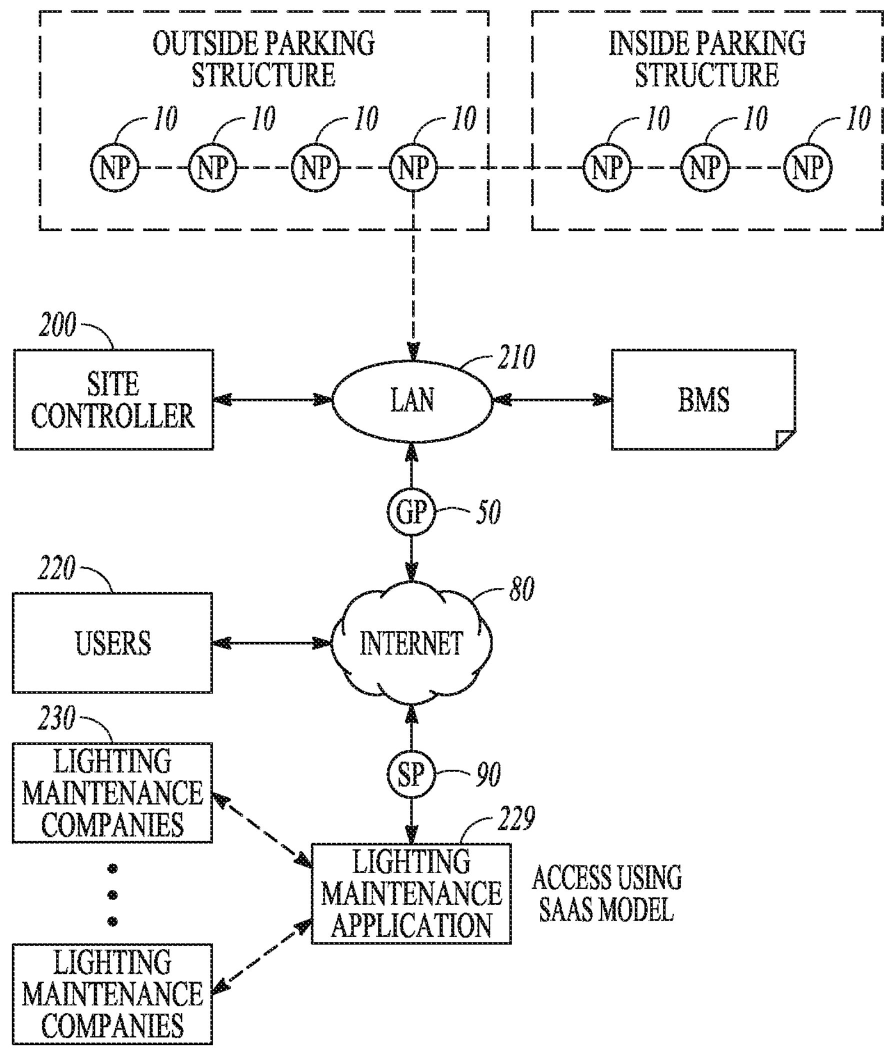
FIG. 14 illustrates a lighting maintenance application, according to an embodiment, for a networked lighting system.

FIG. 14 illustrates a lighting maintenance application 229 (e.g., probabilistic application 117). The lighting maintenance application 229 includes lighting nodes (e.g., node platform 10) that are networked together using a system such as described above, and in turn coupled to a site controller 200. Using the technology described above, information about the lighting nodes, such as power consumption, operational status, on-off activity, and sensor activity are reported to the site controller 200 and/or to the service platform 90. In addition, the site controller 200 and/or service platform 90 can collect performance data such as temperature or current, as well as status data such as activities occurring at the nodes 10. Lighting maintenance application 229, which provides lighting maintenance related functions, accesses raw maintenance data from the service platform 90. Maintenance related data such as LED temperature, LED power consumption, LED failure, network failure and power supply failure can be accessed by a lighting maintenance company 230 from the lighting maintenance application 229 to determine when service is desired or other attention is needed.

Figure 15A:
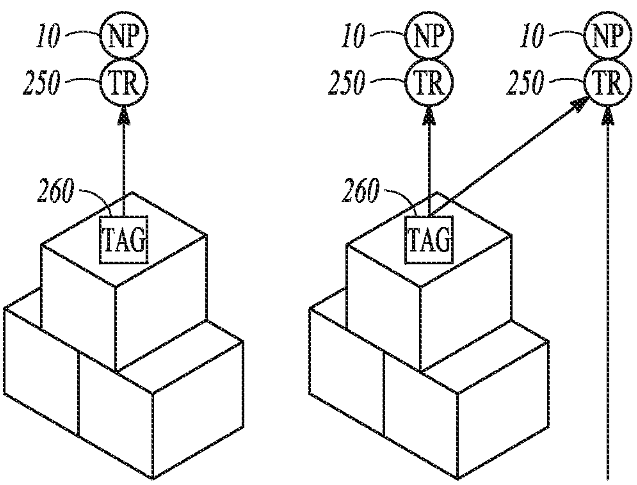
FIG. 15A illustrates a warehouse inventory application, according to an embodiment, for a networked lighting system.
Figure 15B:
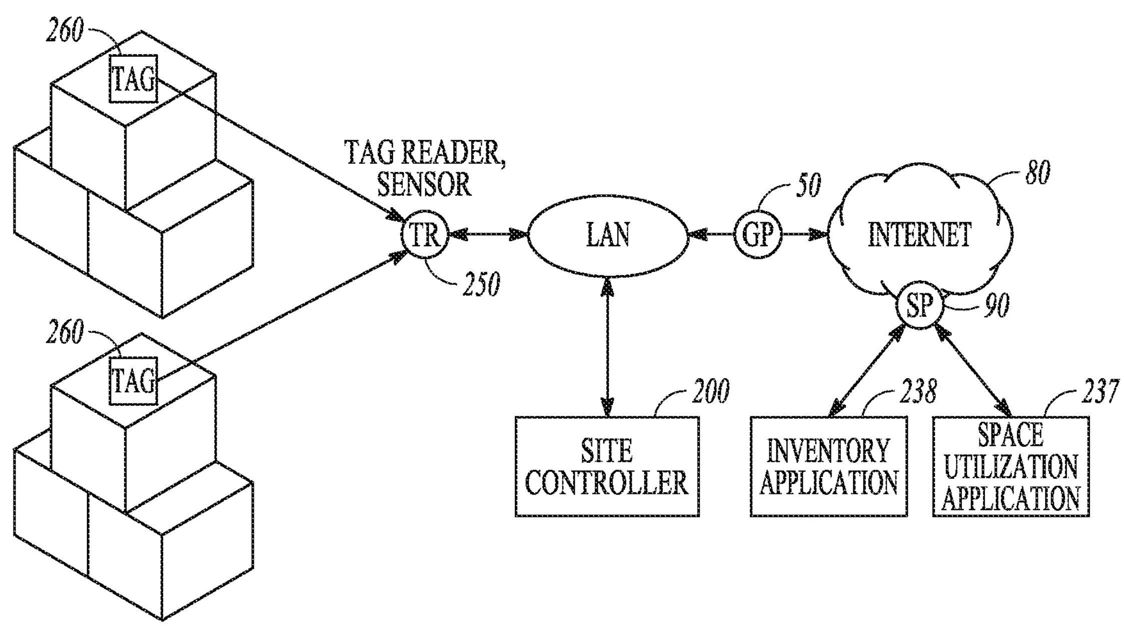
FIG. 15B illustrates a warehouse inventory application, according to an embodiment, for a networked lighting system.

FIGS. 15A and 15B illustrate an inventory application 238 (e.g., probabilistic application 117) and a space utilization application 237 for the above described systems. As illustrated above, a series of RFID tag readers 250 are positioned throughout a warehouse along the node platform 10. These tag readers 250 detect the RFID tags 260 on various items in the warehouse. Using the network of node platforms 10 as described herein, the tag readers 250 can provide that information to a site controller 200 and/or service platform 90. The tag reader 250 collects location and identification information and uses node platform 10 to forward data to the site controller 200 and/or the service platform 90. This data is then forwarded to applications 100 such as the inventory application 238 from the service platform 90. The location and the identification data can be used to track goods traffic inside a protective structure such as a warehouse. The same strategy can be used to monitor warehouse space usage. The sensors 30 detect the presence of items in the warehouse and the space occupied by these items. This space usage data may be forwarded to the site controller 200 and/or the service platform 90. Applications 100 monitoring and managing space may utilize a space utilization application 237 (e.g., probabilistic application 117) to access data that describes space from the service platform 90.

Figure 16:
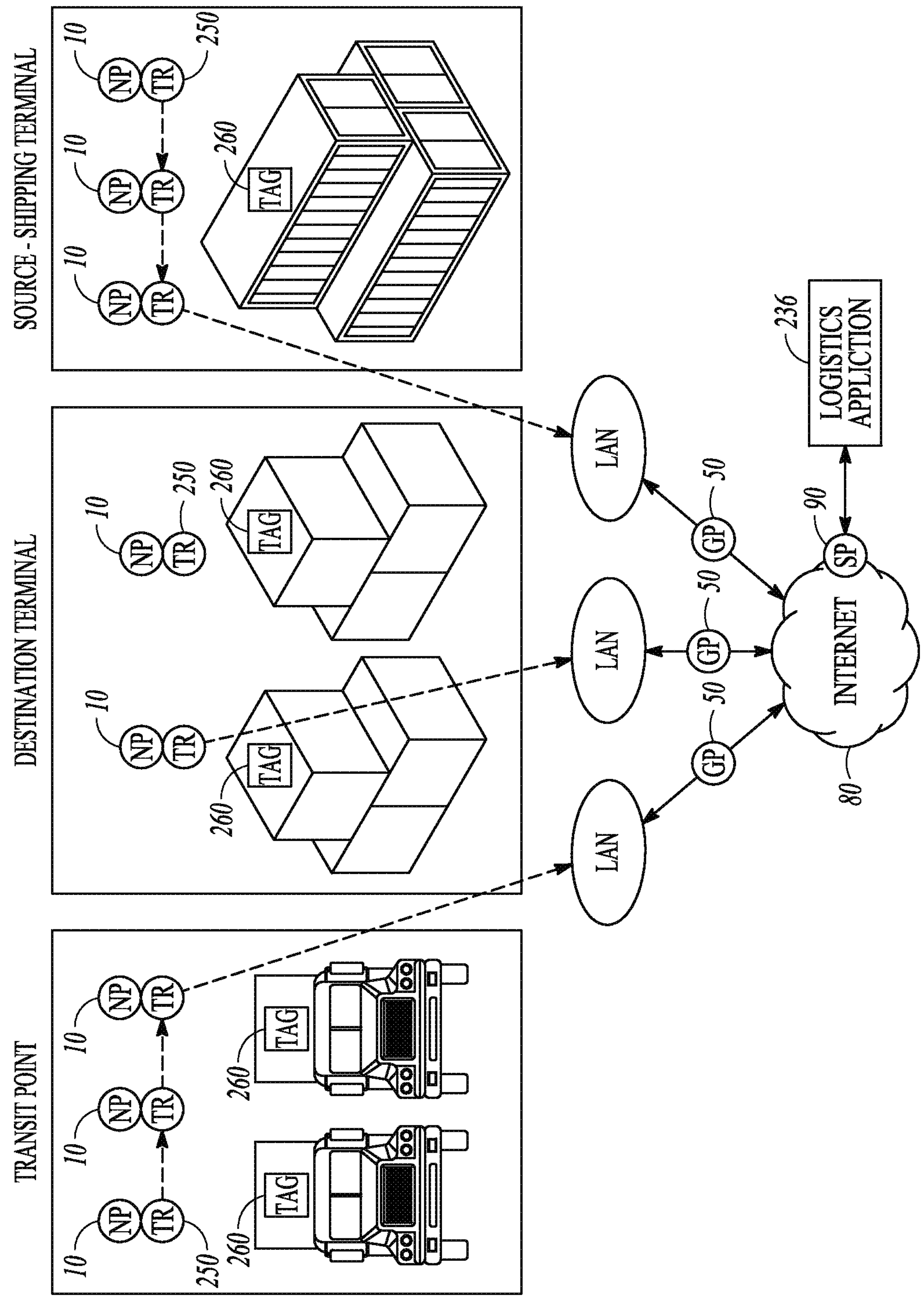
FIG. 16 illustrates an application of a networked lighting system, according to an embodiment, for monitoring of a shipping terminal.

FIG. 16 illustrates a logistics application 236 (e.g., probabilistic application 117) for monitoring a shipping terminal and tracking goods from a source to a destination. For example, RFID tags 260 may be positioned to track goods throughout the source (e.g., shipping port terminal), transit (e.g., weigh station or gas stations) and destination (e.g., warehouse) by utilizing node platforms 10. Similarly, RFID tags 260 may be positioned on the goods and vehicles that are transporting the goods. The RFID tags 260 transmit location, identification and other sensor data information using the node platform 10 that, in turn, transmits the aforementioned information to the service platform 90. This may further be performed using a gateway platform 50 at each site (e.g., source, transit, and destination). The service platform 90 makes this data available to applications 100 such as logistics application 236, enabling users 220 accessing the logistics application 236 to be able to get accurate location and goods status information.

Figure 17:
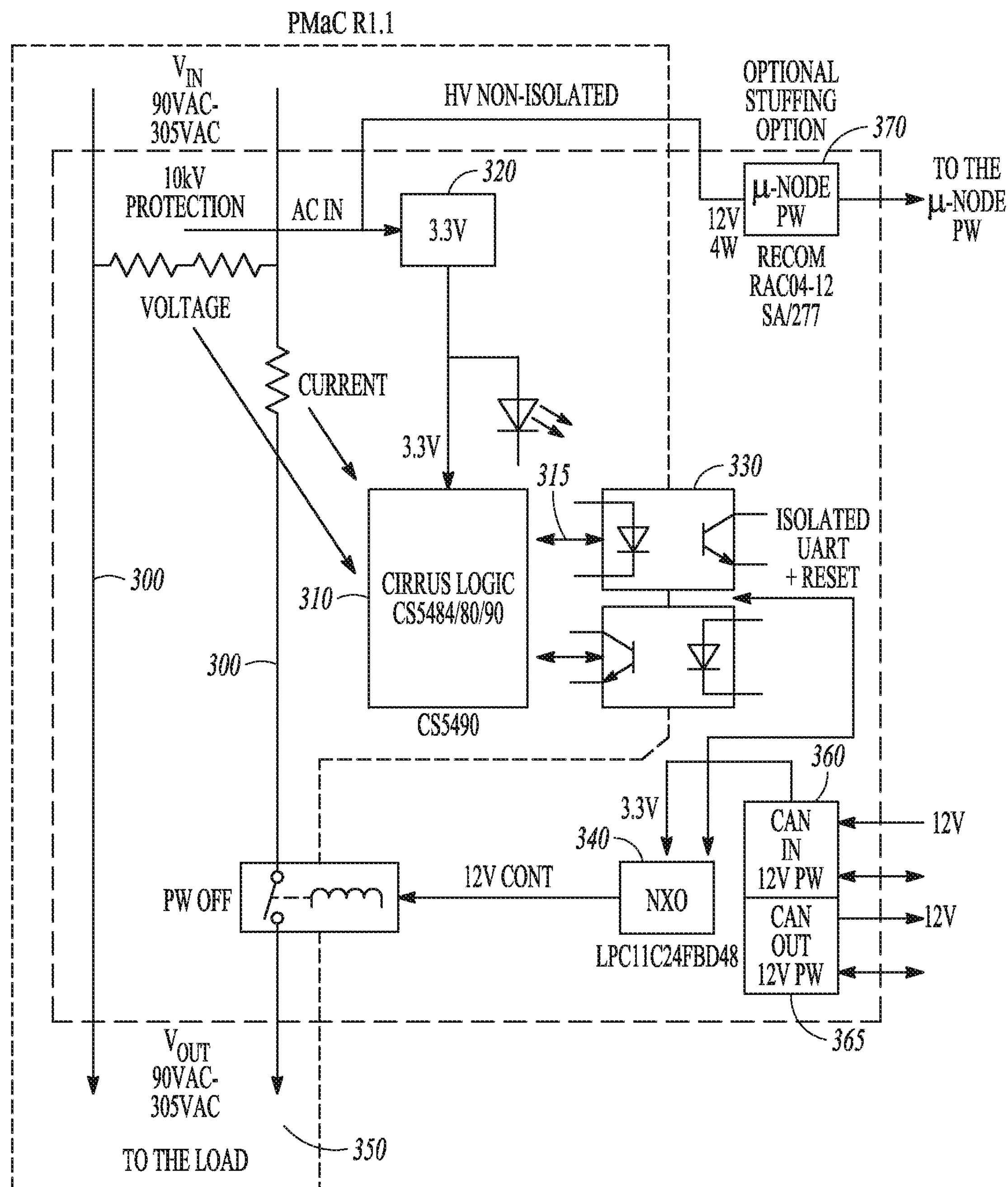
FIG. 17 is a block diagram illustrating power monitoring and control circuitry at a node, according to an embodiment.

FIG. 17 is a block diagram of the electrical components for power monitoring and control within a node. The power measurement and control module illustrated measures incoming AC power, and controls the power provided to the AC/DC converter. It also provides for surge suppression and power to the node components.

This circuitry is used to control the power to the light-emitting diodes at an individual node. The actual count of input or outputs outlined below depends on customer application specifications. As shown in the diagram, AC power is provided via lines 300 at a voltage range between 90 volts and 305 volts. The voltage and current are sensed by an energy measurement integrated circuit 310. An AC-DC transformer 320 provides 3.3 volts to the circuit 310 to power the integrated circuit 310. In FIG. 17, the dashed lines represent the non-isolated portion of the high-voltage system. The dotted lines designate the portion of the circuit that is protected up to 10,000 volts.

Integrated circuit 310 is a complementary metal-oxide-semiconductor (CMOS) power measurement device that measures the line voltage and current. It is able to calculate active, reactive, and apparent power, as well as RMS voltage and current. It provides output signals 315 to a "universal asynchronous receiver/transmitter" (UART) device 330. The UART device 330 translates data between parallel and serial interfaces. The UART 330 is connected to provide signals to a microcontroller 340 that controls the output voltage provided to the load 350, which is preferably the LED lighting system 350. This control is implemented using a switch 355.

Also coupled to the microcontroller 340 are devices 360 and 365, which implement a controller area network bus system, commonly referred to as a CAN bus. The CAN bus allows multiple microcontrollers to communicate with each other without relying upon a host computer. It provides a message-based protocol for communication. The CAN bus allows multiple nodes to be daisy chained together for communications among them.

Optionally provided on the circuit board is a power module 370. The power module 370 accepts AC power through its input terminals and provides controlled DC power at its output terminal. If desired, it can provide input power for some of the devices illustrated in FIG. 18, which is discussed next.

Figure 18:
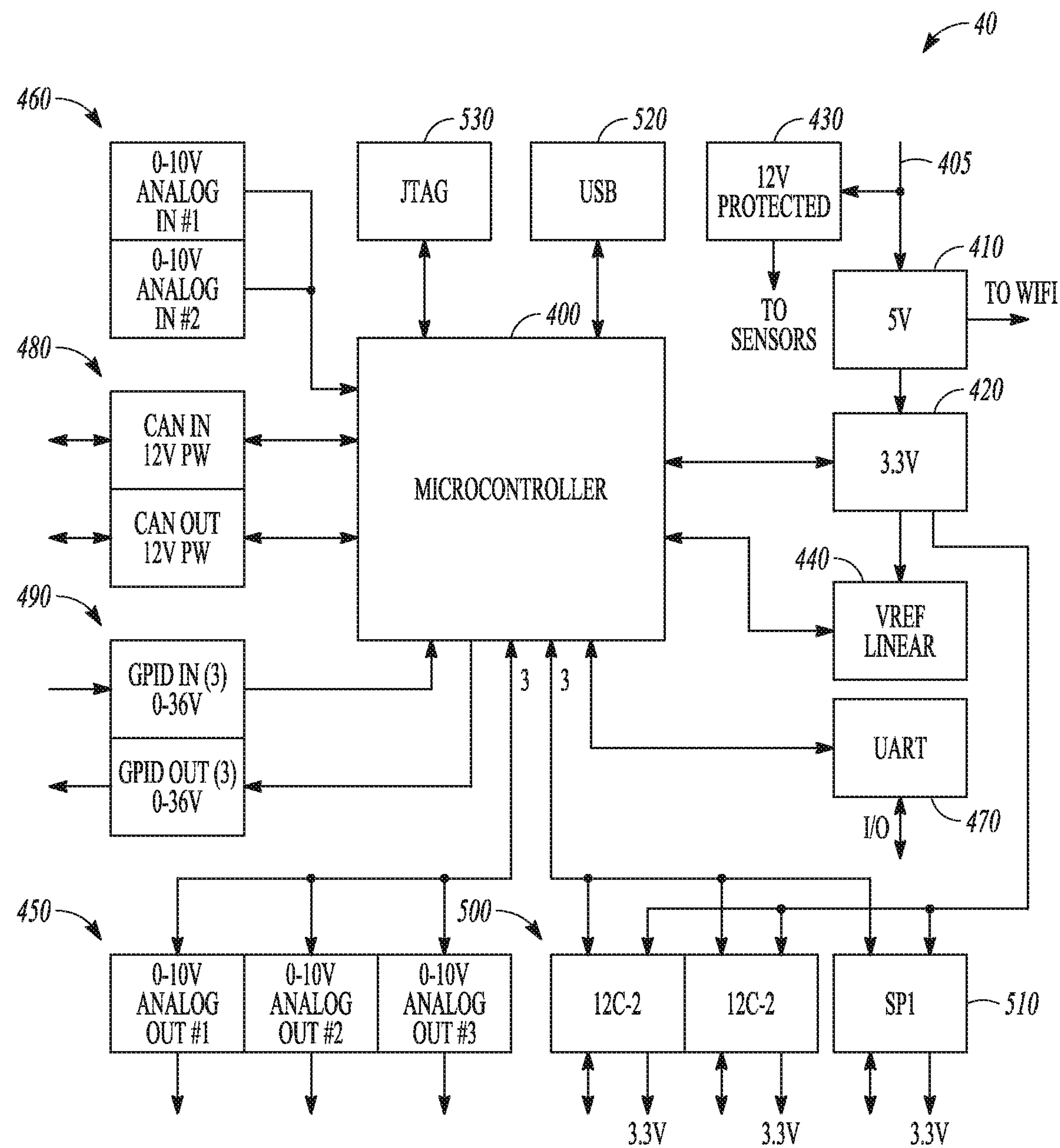
FIG. 18 is a block diagram illustrating an application controller, according to an embodiment, at a node.

FIG. 18 is a block diagram of the application controller located at a node. The node provides for wireless communication with the application software. This application software enables control of the power, lighting, and sensors 30 that are running on microcontroller 400. It also provides power to the various modules illustrated in the figure, and enables communication with the sensors 30.

The application controller in FIG. 18 operates under control of a microcontroller 400, which is depicted in the center of the diagram. Incoming electrical power 405, for example, supplied by module 370 in FIG. 17, is stepped down to 5 volts by transformer 410 to provide electrical power for Wi-Fi communications, and is also provided to a 3.3 volt transformer 420 which powers microcontroller 400. The power supply 430 also receives the input power and provides it to sensors 30 (not shown). The 3.3 volt power is also provided to a reference voltage generator 440.

The microcontroller 400 provides a number of input and output terminals for communication with various devices. In particular, in one embodiment, the microcontroller 400 is coupled to provide three 0 to 10 volt analog output signals 450, and to receive two 0 to 10 volt analog input signals 460. These input and output signals 460 & 450 can be used to control, and to sense the condition of, various sensors 30. Communication with the microcontroller 400 is achieved by UART 470 and using the CAN bus 480. As explained with regard to FIG. 17, CAN bus 480 enables communication among microcontrollers without need of a host computer.

To enable future applications 100, and provide flexibility, microcontroller 400 also includes multiple general-purpose input/output pins 490. These accept or provide signals ranging from 0 to 36 volts. These are generic pins whose behavior can be controlled or programmed through software. Having these additional control lines allows additional functionality enabled by software, without need of replacement of hardware.

Microcontroller 400 is also coupled to a pair of I2C bus interfaces 500. These bus interfaces 500 can be used to connect other components on the board, or to connect other components that are linked via a cable. The I2C bus 500 does not require predefined bandwidth, yet enables multi-mastering, arbitration, and collision detection. Microcontroller 400 is also connected to an SP1 interface 510 to provide surge protection. In addition, microcontroller 400 is coupled to a USB interface 520, and to a JTAG interface 530. The various input and output busses and control signals enable the application controller at the node interface, comprising a wide variety of sensors 30 and other devices, to provide, for example, lighting control and sensor management.

The preceding has been a detailed description of a networked lighting infrastructure for use with sensing applications 100. As described, the system provides unique capabilities for existing or future lighting infrastructure. Although numerous details have been provided with regard to the specific implementation of the system, it will be appreciated that the scope of the disclosure is defined by the appended claims.

Machine and Software Architecture

The modules, methods, engines, applications and so forth described in conjunction with FIGS. 1-18 are implemented in some embodiments in the context of multiple machines and associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here, as those of skill in the art can readily understand how to implement the disclosure in different contexts from the disclosure contained herein.

Software Architecture

Figure 19:
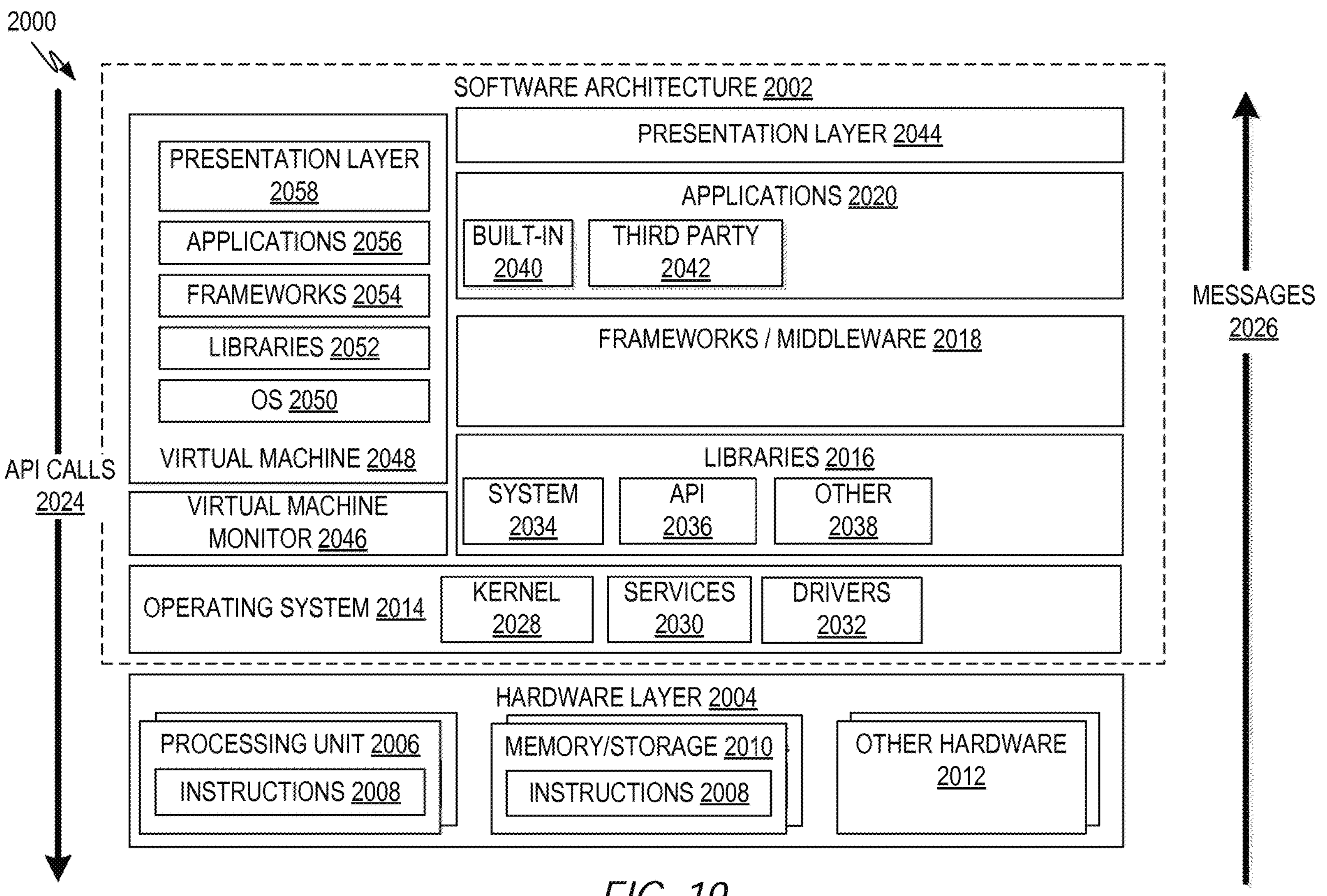
FIG. 19 is a block diagram illustrating an example of a software architecture that may be installed on a machine, according to some example embodiments.

FIG. 19 is a block diagram 2000 illustrating a representative software architecture 2002, which may be used in conjunction with various hardware architectures herein described. FIG. 19 is merely a non-limiting example of a software architecture 2002 and it will be appreciated that many other architectures may be implemented to facilitate the functionality described herein. The software architecture 2002 may be executing on hardware such as machine 2100 of FIG. 20 that includes, among other things, processors 2110, memory 2130, and I/O components 2150. Returning to FIG. 19, a representative hardware layer 2004 is illustrated and can represent, for example, the machine 2100 of FIG. 20. The representative hardware layer 2004 comprises one or more processing units 2006 having associated executable instructions 2008. Executable instructions 2008 represent the executable instructions of the software architecture 2002, including implementation of the methods, engines, modules and so forth of FIGS. 1-18. Hardware layer 2004 also includes memory and/or storage modules 2010, which also have executable instructions 2008. Hardware layer 2004 may also comprise other hardware ,as indicated by 2012, which represents any other hardware of the hardware layer 2004, such as the other hardware 2012 illustrated as part of machine 2100.

In the example architecture of FIG. 19, the software 2002 may be conceptualized as a stack of layers where each layer provides particular functionality. For example, the software architecture 2002 may include layers such as an operating system 2014, libraries 2016, frameworks/middleware 2018, applications 2020 (e.g., probabilistic applications 117) and presentation layer 2044. Operationally, the applications 2020 and/or other components within the layers may invoke application programming interface (API) calls 2024 through the software stack and receive a response, returned values, and so forth, illustrated as messages 2026 in response to the API calls 2024. The layers illustrated are representative in nature and not all software architectures have all layers. For example, some mobile or special purpose operating systems 2014 may not provide a frameworks/middleware layer 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030 and/or drivers 2032). The libraries 2016 may include system 2034 libraries (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media format such as moving picture experts group (MPEG) 4, H.264, MPEG-1 or MPEG-2 Audio Layer (MP3), AAC, AMR, joint photography experts group (JPG), portable network graphics (PNG)), graphics libraries (e.g., an Open Graphics Library (OpenGL) framework that may be used to render 2D and 3D in a graphic content on a display), database libraries (e.g., Structured Query Language (SQL) SQLite that may provide various relational database functions), web libraries (e.g., WebKit that may provide web browsing functionality), and the like. The libraries 2016 may also include a wide variety of other libraries 2038 to provide many other APIs 2036 to the applications 2020 and other software components/modules.

The frameworks 2018 (also sometimes referred to as middleware) may provide a higher-level common infrastructure that may be utilized by the applications 2020 and/or other software components/modules. For example, the frameworks 2018 may provide various graphic user interface (GUI) functions, high-level resource management, high-level location services, and so forth. The frameworks 2018 may provide a broad spectrum of other APIs 2036 that may be utilized by the applications 2020 and/or other software components/modules, some of which may be specific to a particular operating system 2014 or platform.

The applications 2020 include built-in applications 2040 and/or third party applications 2042. Examples of representative built-in applications 2040 may include, but are not limited to, a contacts application, a browser application, a book reader application, a location application, a media application, a messaging application, and/or a game application. Third party applications 2042 may include any of the built in applications as well as a broad assortment of other applications 2020. In a specific example, the third party application 2042 (e.g., an application developed using the Android™ or iOS™ software development kit (SDK) by an entity other than the vendor of the particular platform) may be mobile software running on a mobile operating system 2014 such as iOS™, Android™, Windows® Phone, or other mobile operating systems 2014. In this example, the third party application 2042 may invoke the API calls 2024 provided by the mobile operating system such as operating system 2014 to facilitate functionality described herein.

The applications 2020 may utilize built in operating system functions (e.g., kernel 2028, services 2030 and/or drivers 2032), libraries (e.g., system 2034, APIs 2036, and other libraries 2038), frameworks/middleware 2018 to create user interfaces to interact with users 220 of the system. Alternatively, or additionally, in some systems, interactions with a user 220 may occur through a presentation layer, such as presentation layer 2044. In these systems, the application/module "logic" can be separated from the aspects of the application/module that interact with a user 220.

Some software architectures 2002 utilize virtual machines. In the example of FIG. 19, this is illustrated by virtual machine 2048. A virtual machine 2048 creates a software environment where applications/modules can execute as if they were executing on a hardware machine (such as the machine 2100 of FIG. 20, for example). A virtual machine 2048 is hosted by a host operating system (operating system 2014 in FIG. 21) and typically, although not always, has a virtual machine monitor 2046, which manages the operation of the virtual machine 2048 as well as the interface with the host operating system (i.e., operating system 2014). A software architecture 2002 executes within the virtual machine 2048 such as an operating system 2050, libraries 2052, frameworks/middleware 2054, applications 2056 and/or presentation layer 2058. These layers of software architecture 2002 executing within the virtual machine 2048 can be the same as corresponding layers previously described or may be different.

Example Machine Architecture and Machine-Readable Medium

Figure 20:
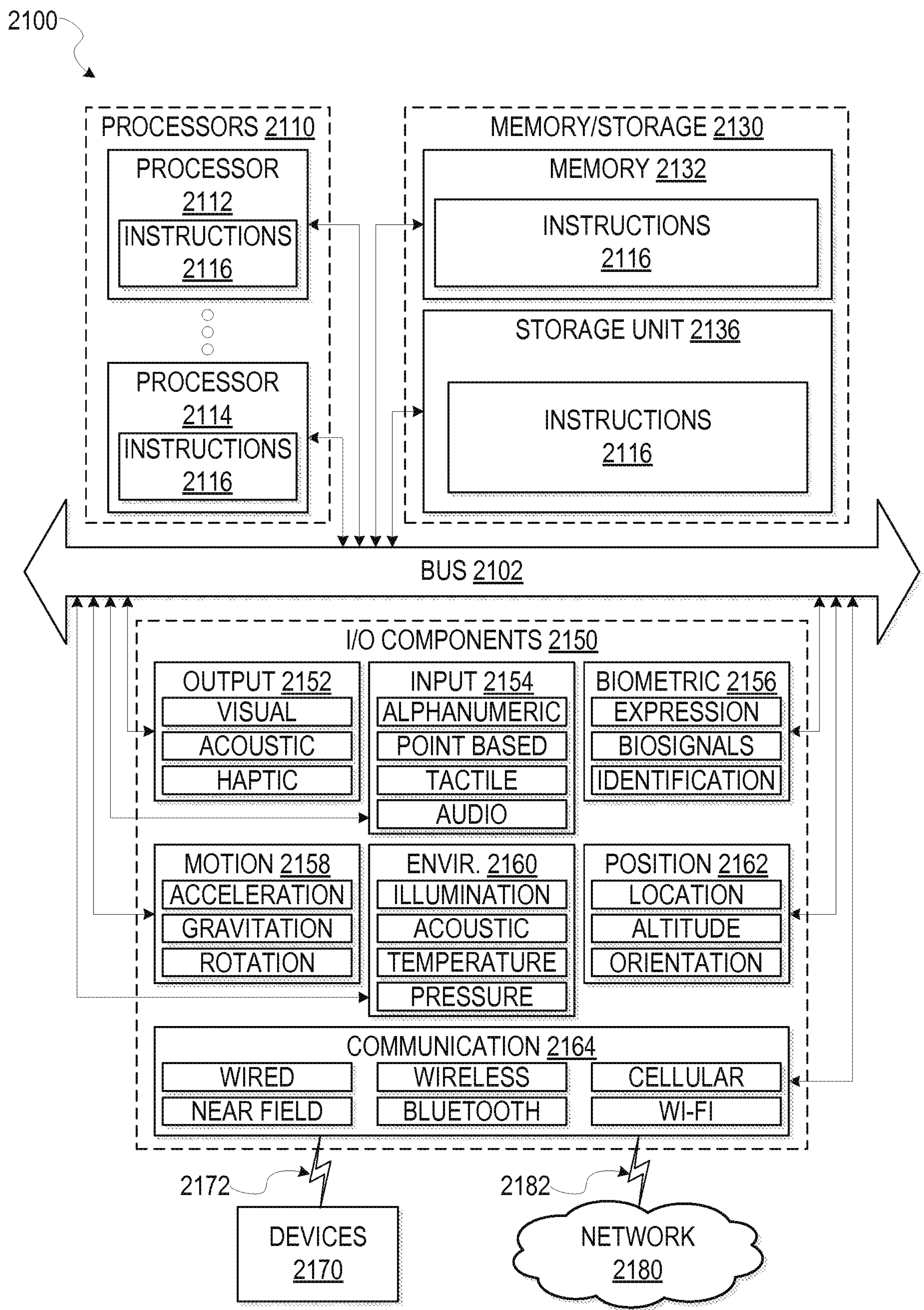
FIG. 20 is a block diagram illustrating components of a machine, according to some example embodiments, able to read instructions from a machine-readable medium (e.g., a machine-readable storage medium) and perform any one or more of the methodologies discussed herein The headings provided herein are merely for convenience and do not necessarily affect the scope or meaning of the terms used.

FIG. 20 is a block diagram illustrating components of a machine 2100, according to some example embodiments, able to read instructions from a machine-readable medium (e.g., a machine-readable storage medium) and perform any one or more of the methodologies discussed herein. Specifically, FIG. 20 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed. For example the instructions 2116 may cause the machine 2100 to execute the flow diagrams of FIG. 6. Additionally, or alternatively, the instructions 2116 may implement the sensing engine 111, correlation engine 113, probabilistic engine 115 and probabilistic applications 117 of FIG. 3, and so forth, including the modules, engines and applications in FIGS. 9-11. The instructions 2116 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines 2100. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 2100 capable of executing the instructions 2116, sequentially or otherwise, that specify actions to be taken by machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory 2130, and I/O components 2150, which may be configured to communicate with each other such as via a bus 2102. In an example embodiment, the processors 2110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 2112 and processor 2114 that may execute instructions 2116. The term "processor" is intended to include multi-core processors 2112 that may comprise two or more independent processors 2112 (sometimes referred to as "cores") that may execute instructions 2116 contemporaneously. Although FIG. 20 shows multiple processors 2112, the machine 2100 may include a single processor 2112 with a single core, a single processor 2112 with multiple cores (e.g., a multi-core process), multiple processors 2112 with a single core, multiple processors 2112 with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116, embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of processors 2110 are examples of machine-readable media.

As used herein, "machine-readable medium" means a device able to store instructions 2116 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 2116. The term "machine-readable medium" shall also be taken to include any medium, or combination of multiple media, that is capable of storing instructions (e.g., instructions 2116) for execution by a machine (e.g., machine 2100), such that the instructions 2116, when executed by one or more processors of the machine 2100 (e.g., processors 2110), cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine 2100 will depend on the type of machine. For example, portable machines 2100 such as mobile phones will likely include a touch input device or other such input mechanisms, while a headless server machine will likely not include such a touch input device. It will be appreciated that the I/O components 2150 may include many other components that are not shown in FIG. 20. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via coupling 2182 and coupling 2172 respectively. For example, the communication components 2164 may include a network interface component or other suitable device to interface with the network 2180. In further examples, communication components 2164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2170 may be another machine 2100 or any of a wide variety of peripheral devices (e.g., a peripheral device coupled via a Universal Serial Bus (USB)).

Moreover, the communication components 2164 may detect identifiers or include components operable to detect identifiers. For example, the communication components 2164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 2180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet 80, a portion of the Internet 80, a portion of the public switched telephone network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or other type of cellular or wireless coupling. In this example, the coupling 2182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to devices 2170. The term "transmission medium" shall be taken to include any intangible medium that is capable of storing, encoding, or carrying instructions 2116 for execution by the machine 2100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "disclosure " merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

receiving, by a device, raw sensor data from a plurality of sensors in a light sensory network,
 the light sensory network including a plurality of nodes, and
 the plurality of sensors including a first sensor located on a first node, of the plurality of nodes;
 generating, by the device, semantic data based on the raw sensor data,
 the semantic data including a plurality of sensed event records that each indicate a corresponding event sensed by a corresponding sensor of the plurality of sensors,
  the corresponding sensor being associated with a corresponding node, of the plurality of nodes, and
 each sensed event record including a set of classifiers that classify the semantic data and signify meaning of the raw sensor data,
  a first classifier, of the set of classifiers, indicating an event detected by the corresponding sensor, and
  a second classifier, of the set of classifiers, indicating a probability that the first classifier is true,
   the probability being based on at least one of a sensor location of the corresponding sensor, an event location at which the event occurred, or an obstruction of the corresponding sensor in relation to the event;
grouping, by the device, the sensed event records into groups of sensed event records based on the set of classifiers;
generating, by the device, a derived event record based on a group of sensed event records, of the groups of sensed event records,
 the derived event record including:
  a third classifier that indicates an event detected by multiple sensors, of the plurality of sensors, and
  a fourth classifier that indicates a probability that the third classifier is true; and
enabling, by the device, at least one application to perform a service based on the derived event record.

2. The method of claim 1, wherein the raw sensor data includes one or more of:
 visual data,
 audio data, and
 environmental data, and
 wherein the event includes at least one of:
  detecting a person,
  detecting a vehicle,
  detecting an object, and
  detecting an empty parking space.

3. The method of claim 1, wherein the event represented by the semantic data is associated with a binary state.

4. The method of claim 1, wherein each sensed event record includes an application identifier that is utilized to identify the at least one application from a plurality of applications,
 wherein each application of the plurality of applications is utilized to perform a different service.

5. The method of claim 1, wherein the set of classifiers further includes a fifth classifier that indicates the sensor location of the corresponding sensor.

6. The method of claim 1, wherein set of classifiers further includes a fifth classifier that indicates the event location at which the event occurred.

7. A system comprising:
 one or more memories; and
 one or more processors, communicatively coupled to the one or more memories, to:
  receive raw sensor data from a plurality of sensors in a light sensory network, the light sensory network including a plurality of nodes, and
  the plurality of sensors including a first sensor located on a first node, of the plurality of nodes;
 generate semantic data based on the raw sensor data,
  the semantic data including a plurality of sensed event records, each sensed event record including:
   a first classifier that indicates an event detected by a corresponding sensor, of the plurality of sensors, the corresponding sensor being associated with a corresponding node, of the plurality of nodes, and
   a second classifier that indicates a probability that the first classifier is true, the probability being based on at least one of a sensor location of the corresponding sensor, an event location at which the event occurred, or an obstruction of the corresponding sensor in relation to the event;
 generate a derived event record based on a group of sensed event records, of groups of sensed event records,
  the generated derived event record including:
   a third classifier that indicates an event detected by multiple sensors, of the plurality of sensors, and
   a fourth classifier that indicates a probability that the third classifier is true; and
 enable at least one application to perform a service based on the generated derived event record.

8. The system of claim 7, wherein the raw sensor data includes one or more of:
 visual data,
 audio data, or
 environmental data, and
 wherein the event includes at least one of:
  a detection of a person,
  a detection of a vehicle,
  a detection of an object, or
  a detection of an empty parking space.

9. The system of claim 7, wherein the event is associated with a binary state, the binary state including at least one of:

a parking space being occupied; or the parking space not being occupied.

10. The system of claim 7, wherein the one or more processors are further to:

analyze the semantic data based on user input, and wherein the user input includes at least one of:

a desired accuracy, or a user preference.

11. The system of claim 7, wherein the one or more processors are further to:

analyze the semantic data based on a weight that is assigned to the second classifier, and wherein the one or more processors are further to:

alter the weight over time.

12. The system of claim 7, wherein the one or more processors are further to:

analyze the semantic data based on a first threshold, and wherein the first threshold defines a minimum level of raw sensor data that is utilized to produce a first derived event.

13. The system of claim 7, wherein the at least one application includes at least one of:

a parking location application, a surveillance application, a traffic application, retail customer application, a business intelligence application, an asset monitoring application, an environmental application, or an earthquake sensing application.

14. The system of claim 7, wherein each sensed event record further includes:

a fifth classifier that indicates the sensor location of the corresponding sensor, and a sixth classifier that indicates the event location at which the event occurred.

15. A non-transitory computer-readable medium storing instructions, the instructions comprising:

one or more instructions, when executed by one or more processors, cause the one or more processors to:

generate semantic data based on raw sensor data, the semantic data including a plurality of sensed event records that each indicate a corresponding event sensed by a corresponding sensor, of a plurality of sensors, the corresponding sensor being located on a corresponding node, of a plurality of nodes in a light sensory network, and each sensed event record including:

a first classifier that indicates an event detected by the corresponding sensor, and a second classifier that indicates a probability that the first classifier is true, the probability being based on at least one of a sensor location of the corresponding sensor, an event location at which the event occurred, or an obstruction of the corresponding sensor in relation to the event;

generate a derived event record based on a group of sensed event records, of groups of sensed event records, the generated derived event record including:

a third classifier that indicates an event detected by multiple sensors, of the plurality of sensors, and a fourth classifier that indicates a probability that the third classifier is true; and enable at least one application to perform a service based on the generated derived event record.

16. The non-transitory computer-readable medium of claim 15, wherein the at least one application includes at least one of:

a parking location application, a surveillance application, a traffic application, retail customer application, a business intelligence application, an asset monitoring application, an environmental application, or an earthquake sensing application.

17. The non-transitory computer-readable medium of claim 15, wherein the derived event record includes derived event information, the derived event information being associated with business intelligence monitoring.

* * * * *